(12) United States Patent
Broadhead et al.

(10) Patent No.: US 8,700,466 B2
(45) Date of Patent: Apr. 15, 2014

(54) METHODS AND SYSTEMS FOR PROVIDING CHILD-ORIENTED COMPUTER NETWORK APPLICATIONS, ADVERTISING, AND USER FEEDBACK

(75) Inventors: Thomas C. Broadhead, San Diego, CA (US); Clifford T. Boro, San Diego, CA (US); William J. Von Reis, Del Mar, CA (US); Brian E. Smith, San Diego, CA (US)

(73) Assignee: Saban Digital Studios LLC, Los Angeles, CA (US)

( * ) Notice: Subject to any disclaimer, the term of this patent is extended or adjusted under 35 U.S.C. 154(b) by 10 days.

(21) Appl. No.: 13/465,932

(22) Filed: May 7, 2012

(65) Prior Publication Data

US 2013/0124328 A1    May 16, 2013

Related U.S. Application Data

(60) Provisional application No. 61/483,026, filed on May 5, 2011.

(51) Int. Cl.
*G06Q 30/00* (2012.01)
*G06Q 30/02* (2012.01)

(52) U.S. Cl.
CPC ........ *G06Q 30/0257* (2013.01); *G06Q 30/0255* (2013.01); *G06Q 30/0269* (2013.01); *G06Q 30/0253* (2013.01); *G06Q 30/0251* (2013.01); *G06Q 30/0241* (2013.01)

USPC .................. 705/14.55; 705/14.53; 705/14.66; 705/14.51; 705/14.49; 705/14.4

(58) Field of Classification Search
CPC .................................................. G06Q 30/0257
USPC ....................................................... 705/14.55
See application file for complete search history.

(56) References Cited

U.S. PATENT DOCUMENTS

| | | | | |
|---|---|---|---|---|
| 4,872,113 | A * | 10/1989 | Dinerstein | 705/7.33 |
| 8,171,107 | B2 | 5/2012 | Vignisson et al. | |
| 2006/0123053 | A1* | 6/2006 | Scannell, Jr. | 707/104.1 |
| 2008/0307339 | A1 | 12/2008 | Boro et al. | |
| 2009/0254617 | A1 | 10/2009 | Vignisson et al. | |
| 2009/0254656 | A1 | 10/2009 | Vignisson et al. | |
| 2010/0100455 | A1* | 4/2010 | Song | 705/26 |

* cited by examiner

*Primary Examiner* — John G Weiss
*Assistant Examiner* — Scott C Anderson
(74) *Attorney, Agent, or Firm* — SoCal IP Law Group LLP; Steven C. Sereboff; Jonathan Pearce

(57) ABSTRACT

Exemplary methods and devices in accordance with the disclosure relate generally to networked provisioning of content to young users such as children, as well as providing user monitoring and customized feedback and other information to parents and others. More particularly, but not exclusively, embodiments in accordance with the disclosure relate to systems, methods, devices, and computer media for receiving user input associated with provided or available content, processing the input, and providing information such as text, video, audio, other media, advertising, and feedback associated with user inputs and preferences to a person associated with the user.

58 Claims, 24 Drawing Sheets

Example System Configuration

Example System Configuration

Example Client Application Configuration

Example Server System Module Configuration

Example Process for Receiving User Information and Serving Ad or Other Information Example Process for Responding to Served Ad or Other Information

*Example Process for Providing Video Ads and Likes*

*Example Process for Providing "Parent Touch Point" Feature*

Example Advertisement Selection Algorithm

*Example Process for Providing Age and/or Gender Targeted Ads and Content*

*Example Process for Providing Geotargeted Content*

*Example Process for Providing Targeted Content from Server System*

*Example Process for Receiving and Processing Targeted Content at a User Device*

Example Screenshot of Child-Oriented Webpage with User Selection Options

Example Screenshot of Game Content Selection Option

Example Screenshot of Subsequent Page Associated with FIG. 13

Example Screenshot of Provided Content and "Like" Selection Option

Example Screenshot of Parent Feedback and Advertising

Example Screenshot of Advertiser/Third Party Usage Feedback

Example Process for Receiving Approval to Purchase Product From Person Associated with User Example Process for Receiving Pre-Approval to Purchase Products From Person Associated with User Example Screenshot of Content Provided to Child Offering a Product Example Screenshot of Acknowledgement Provided to Child for Selecting a Product Example Screenshot of Content Provided to Child Offering a Product Example Process for Providing Statistical Information Regarding Age and/or Gender Groups

US 8,700,466 B2

METHODS AND SYSTEMS FOR PROVIDING CHILD-ORIENTED COMPUTER NETWORK APPLICATIONS, ADVERTISING, AND USER FEEDBACK

PRIORITY

This application claims priority under 35 U.S.C. 119(e) to U.S. provisional application No. 61/483,026 entitled "METHODS AND SYSTEMS FOR PROVIDING CHILD-ORIENTED COMPUTER NETWORK APPLICATIONS, ADVERTISING AND USER FEEDBACK," filed on May 5, 2011, the content of which is hereby expressly incorporated by reference in its entirety for all purposes.

CROSS-REFERENCE TO RELATED APPLICATIONS

This application is also related to U.S. patent application Ser. No. 12/395,616, entitled METHOD AND APPARATUS FOR NAVIGATION AND USE OF A COMPUTER NETWORK, filed on Feb. 27, 2009, to U.S. patent application Ser. No. 12/037,082, entitled CHILD-ORIENTED COMPUTING SYSTEM, filed Feb. 25, 2008, to U.S. patent application Ser. No. 12/395,610, entitled METHOD AND APPARATUS FOR CUSTODIAL MONITORING, FILTERING, AND APPROVING OF CONTENT, filed Feb. 27, 2009, to U.S. patent application Ser. No. 12/395,605, entitled METHOD AND APPARATUS FOR EDITING, FILTERING, RANKING, AND APPROVING CONTENT, filed Feb. 27, 2009, to U.S. patent application Ser. No. 13/465,974, entitled METHODS AND SYSTEMS FOR PROVIDING TARGETED ADVERTISING THROUGH A CHILD-ORIENTED COMPUTER NETWORK APPLICATION, filed on even date herewith, and to U.S. patent application Ser. No. 13/465/454, entitled METHODS AND SYSTEMS FOR FACILITATING ELECTRONIC COMMERCE USING A CHILD-ORIENTED COMPUTER NETWORK APPLICATION, filed on even date herewith. The content of each of these applications is hereby incorporated by reference herein in its entirety for all purposes. These applications may be referred to collectively herein as the "Related Applications" for purposes of brevity.

FIELD

The present invention relates generally to networked provision of content to young users such as children. More particularly, but not exclusively, the invention relates to systems, methods, devices, and computer media for receiving user input associated with provided or available content, processing the input, and providing information such as text, video, audio, other media, advertising, and feedback associated with user inputs and preferences.

BACKGROUND

Over the past 10 years, the ability to access information via networks such as the Internet has become a normal, accepted part of everyday life. Moreover, the ability to interact with digital knowledge sources is of such fundamental importance that parents and schools have encouraged computer literacy in children of increasingly younger ages, and access to the Internet and other data and information networks is becoming ubiquitous. Consequently, more and more young children are gaining regular and ongoing access to computer and other data providing devices such as tablets and smart phones in typical homes and schools.

This increased Internet (used collectively herein to refer to computer networked sources of data and information as well as newer devices such as tablets, smart phones, and other similar or equivalent devices) use by children creates a challenge for parents, as well as others in supervisory roles such as teachers, who may wish to monitor or filter the information to which a child has access. Further, a parent may determine that a child should spend more time using a personal computing device for one type of use (such as studying or other educational uses, doing homework, etc.) and less time using it for other uses (such as playing games, communicating with friends, accessing social networks, etc.). Unfortunately, modern personal computers, as well as other data providing devices typically do not provide a parent with the controls that would allow the parent to define a policy relating to how a child may use the personal computing device.

There have been some attempts to provide a children safe computing and browsing environment. In some cases, filtering software is provided that enables a parent to block certain web sites from access without a password. In theory, when the parent is surfing the web, the parent can disable the feature or supply the required password when blocked content is desired. Some systems may also include an ability to search for certain words and phrases and block websites that contain those phrases. Using this approach, a child is prevented from defeating the system due to lack of knowledge of the password. However, these systems do not allow parents to receive information associated with a child's use of the network on allowable sites. In addition, current systems lack the ability to provide targeted advertising information beyond the potential interests of particular users, such as specific children, to related individuals such as their parents, teachers, or others such as relatives or persons in supervisory positions.

SUMMARY

Exemplary embodiments of the invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

An exemplary method in accordance with the disclosure includes providing, to a client application, targeted content for rendering to a user. The method further includes receiving, from the client application, an indication of a preference selection made by the user with respect to the targeted content, selecting information to be provided to a person associated with the user based at least in part on the preference selection, and electronically sending the information.

A processor readable medium in accordance with the disclosure includes instructions for causing a processor to provide, to a client application, targeted content for rendering to a user and receive, from the client application, an indication of a preference selection made by the user with respect to the targeted content. The processor readable medium further includes instructions for causing the processor to select information to be provided to a person associated with the user based at least in part on the preference selection, and electronically send the information.

Yet another processor readable medium in accordance with the disclosure includes instructions for causing a processor to receive, at a client application executing on a user device, targeted content for rendering to a user, said targeted content including information defining a preference selection option. The instructions further cause the processor to present the preference selection option on the user device, receive, from a user, an indication of a preference selection made by the user with respect to the preference selection option, and send, to a server system, preference selection information corresponding to the preference selection wherein the server system is configured to select and electronically send information associated with the preference selection information to a device of a person associated with the user.

A user device in accordance with the disclosure includes a processor and a memory coupled to the processor, the memory containing instructions for execution on the processor which cause the processor to receive, at a client application executing on a user device, targeted content for rendering to a user, said targeted content including information defining a preference selection option and present the preference selection option on the user device. The instruction further cause the processor to receive, from a user, an indication of a preference selection made by the user with respect to the preference selection option, and send, to a server system, preference selection information corresponding to the preference selection wherein the server system is configured to select information associated with the preference selection information for sending to a device of a person associated with the user.

Another exemplary method in accordance with the disclosure includes providing, to a user device associated with a user included within a first demographic group, an advertisement for a product, receiving an indication that the advertisement has been rendered by the user device, and providing, to a device of a person associated with the user, preference information relating a preference for the product exhibited by one or more other members of a particular demographic group.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present invention is more fully appreciated in connection with the following detailed description taken in conjunction with the accompanying drawings, wherein.

DETAILED DESCRIPTION OF EMBODIMENTS

Figure 1:
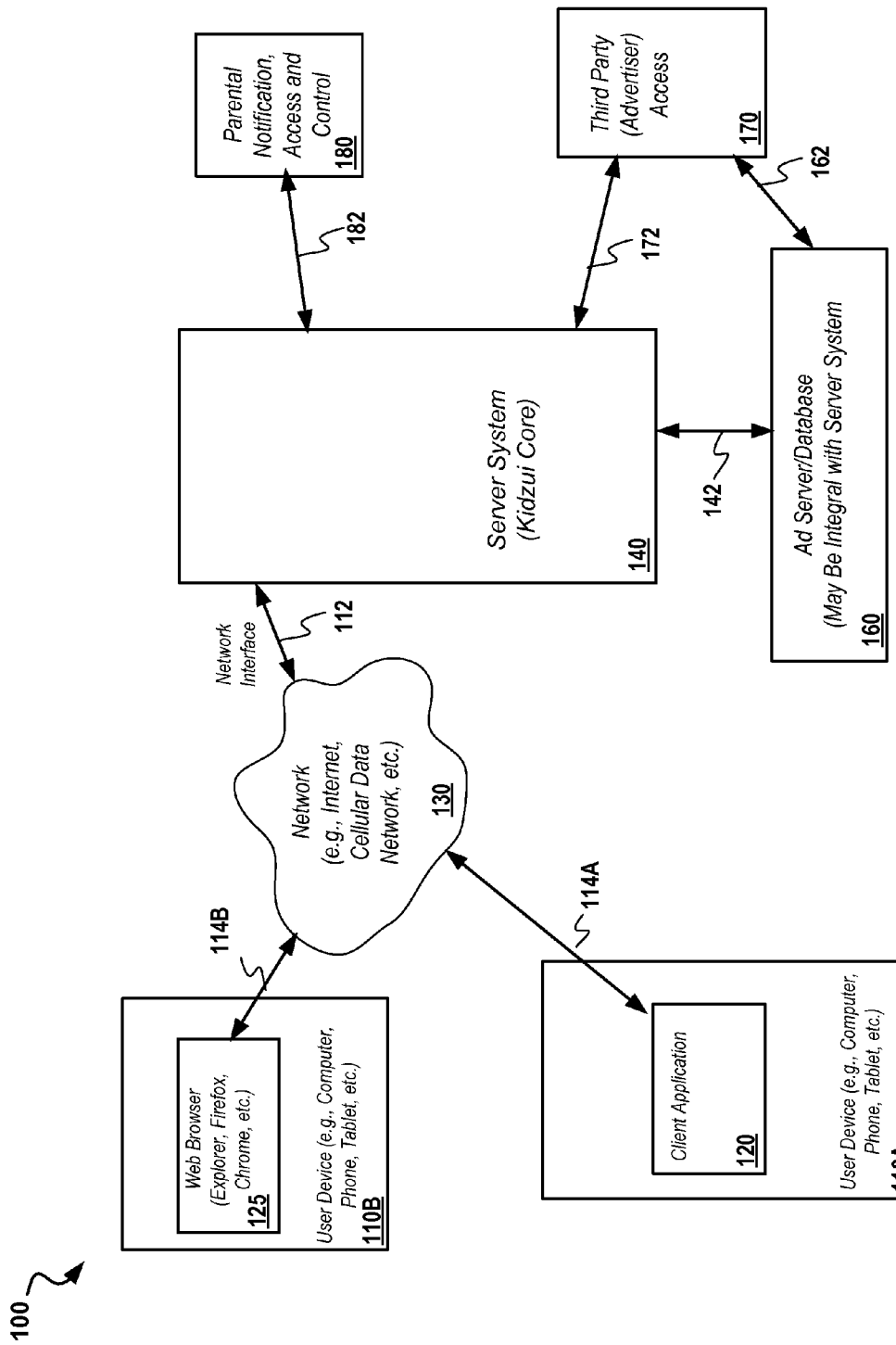
FIG. 1 illustrates details of a system on which embodiments of the present invention may be implemented.

The present invention relates generally to networked provision of content to young users such as children, as well as providing user monitoring and customized feedback and other information to parents and others. More particularly, but not exclusively, the invention relates to systems, methods, devices, and computer media for receiving user input associated with provided or available content, processing the input, and providing information such as text, video, audio, other media, advertising, and feedback associated with user inputs and preferences.

Various aspects of providing methods and systems associated with provision of content to young network users, such as children, are described in the Related Applications, which are incorporated by reference herein in their entirety.

For example, U.S. patent application Ser. No. 12/395,616, entitled METHOD AND APPARATUS FOR NAVIGATION AND USE OF A COMPUTER NETWORK describes systems and methods for navigation and use of a computer network. The described system allows multiple users to simultaneously explore a network in groups of two or more. This capability allows one of the users to be a leader of the exploration and the leader can change during the exploration as desired. A user can also save an exploration session and share it with others, so that others can recreate the experience of the first user automatically. The system also allows for the easy creation of circles of network friends where content and information can be easily shared, and may be applied to embodiments that manage context to be accessed by children on computer networks such as the Internet.

Further, U.S. patent application Ser. No. 12/037,082, entitled CHILD-ORIENTED COMPUTING SYSTEM, describes various embodiments including an operating system (e.g. Linux operating system, Window's operating system) with a graphical user interface designed to enable common tasks performed by kids, such as doing homework, playing games, and communicating with other kids. The system may be preloaded with games and homework tools, as well as ability to watch DVDs and TV (and record programs), and may include communication software, such as email and instant messenger applications, as well as other networking applications. In addition, the described systems and methods may be provided with parental controls, such as controls that control the content that children can access (whether on a client application, websites, games, mobile devices, such as smart phones, tablets, and the like), controls that restrict when children can access what content, and controls based on events (such as allowing access to games or television when homework is complete). Controls can be exercised by and/or shared with others, such as teachers, tutors, caregivers, or the like.

A subscription service that allows parents to modify controls through, for example, a remote network interface, such as a Web interface, may be included. Through the networks parents can help children keep schedules, sending timed messages about homework, sending photographs or video, and the like. In some embodiments, the parental controls may provide control over the time when the applications on the computing system are available to the child. For example, a parent may set the controls to allow the child to watch television, video, or a DVD between certain hours in the day, while other activities such as word processing, spreadsheet software and the like may be offered during other periods including overlapping periods.

In some embodiments, a child-oriented computing system may provide parental control over a child's use of the computing facility, wherein the control may be administered locally at the computing facility or remotely from an administrative computing facility. Some embodiments may provide the remote parental controls to allow parents to set, reset, and modify parental controls, to integrate and send content, such as videos or movies (such as home movies or other movies, video, animations, or similar content), to set calendar events, to send messages and the like, as well as to transmit calendars items and messages from their Web site to the computing facility.

In some embodiments, the user interface and content for the system may be adaptive and may change automatically, with user triggers, based on events, such as the age of a child or the user interface and content may change based on another parameter. For example, as a child celebrates a birthday or the child achieves a certain level of competence, the computer or other device may make available new applications, such as instant messenger, or access to age-appropriate games and contents. Also, the content of applications may become more sophisticated and robust, such as offering other buttons and controls that are hidden for younger children. In addition, in some embodiments the user interface and/or content may change based on the user demonstrating proficiency, such as adding more functions of an application or presenting new applications when a child demonstrates mastery of a particular task. For example, if a child shows the ability to open and view photos, applications for editing and sending photos may be presented, and the like.

Various embodiments of the child-oriented computing system may be provided with an administrative server application and an administrative software component provided locally at a computing facility and/or remotely at an external facility or an administrative computing facility, respectively. Some of these embodiments provide parental controls that are only locally accessible at the computing facility. Others of these embodiments provide only remotely accessible parental controls that are not accessible at the computing facility. Still others of the embodiments provide a mix of local and remote parental control. In some embodiments, the child-oriented computing system may provide a parental community that may enable parents to communicate with each other and/or with third parties.

In addition, U.S. patent application Ser. No. 12/395,610, entitled METHOD AND APPARATUS FOR CUSTODIAL MONITORING, FILTERING, AND APPROVING OF CONTENT, describes method and systems for a parent or other custodian or guardian to monitor, filter, and approve of content to be accessed by a child or children on a network. In one embodiment, the system may log all activity on a network by a child and sends regular historical reports to the parent for review. The parent may then set certain triggers that will provide more immediate feedback when certain events occur or when certain types of data are accessed, or an attempt is made by the child for such access. The system may allows the parent to control the filters and options from a variety of sources, including via the child's computer, texting, instant messaging, cell phone, other web enabled computers, PDA's, etc. The system may be associated with real world tasks such as homework, chores, exercise, etc, where the completion of a task can result in permission for use, or enhanced use, of the network by the child. In addition, the system may be configured to track child usage and provide directed advertising or information to the parent related to the child's interests as evidenced by network use. The system may be configured to allow it to be customized with different rules for different media types, and rules related not just to viewing, but to sharing of files and media with others.

Further, U.S. patent application Ser. No. 12/395,605, entitled METHOD AND APPARATUS FOR EDITING, FILTERING, RANKING, AND APPROVING CONTENT, describes systems and methods for editing, filtering, ranking, and approving content. In one embodiment, the system provides a browsing environment for children that routes all internet requests through a central server system (also denoted herein as a Kidzui System based on a specific implementation developed by the assignee of the instant application). The server may check the URL of the request against a database of approved sites. If there is a match, the system then permits access to the site. Conversely, If there is no match, the website access is blocked and the child is notified. In some embodiments, the system may also notify the parents or update a history report each time a non-approved website is requested. The request to a blocked website may automatically be forwarded to one of a plurality of editors who can then access the site and determine on a page or site basis as to whether the request is suitable for the browsing environment. The system may further include a workflow management system that determines which of the plurality of editors will be assigned a link to review. Approved content may be categorized by the age and gender of the users of the content. The approved content may also be categorized as a resource or reference to assist in accomplishing homework or other assignments.

Various embodiments of the present invention may be configured to provide the functions described in the Related Applications, as well as provide further functionality such as described below.

Figure 2:
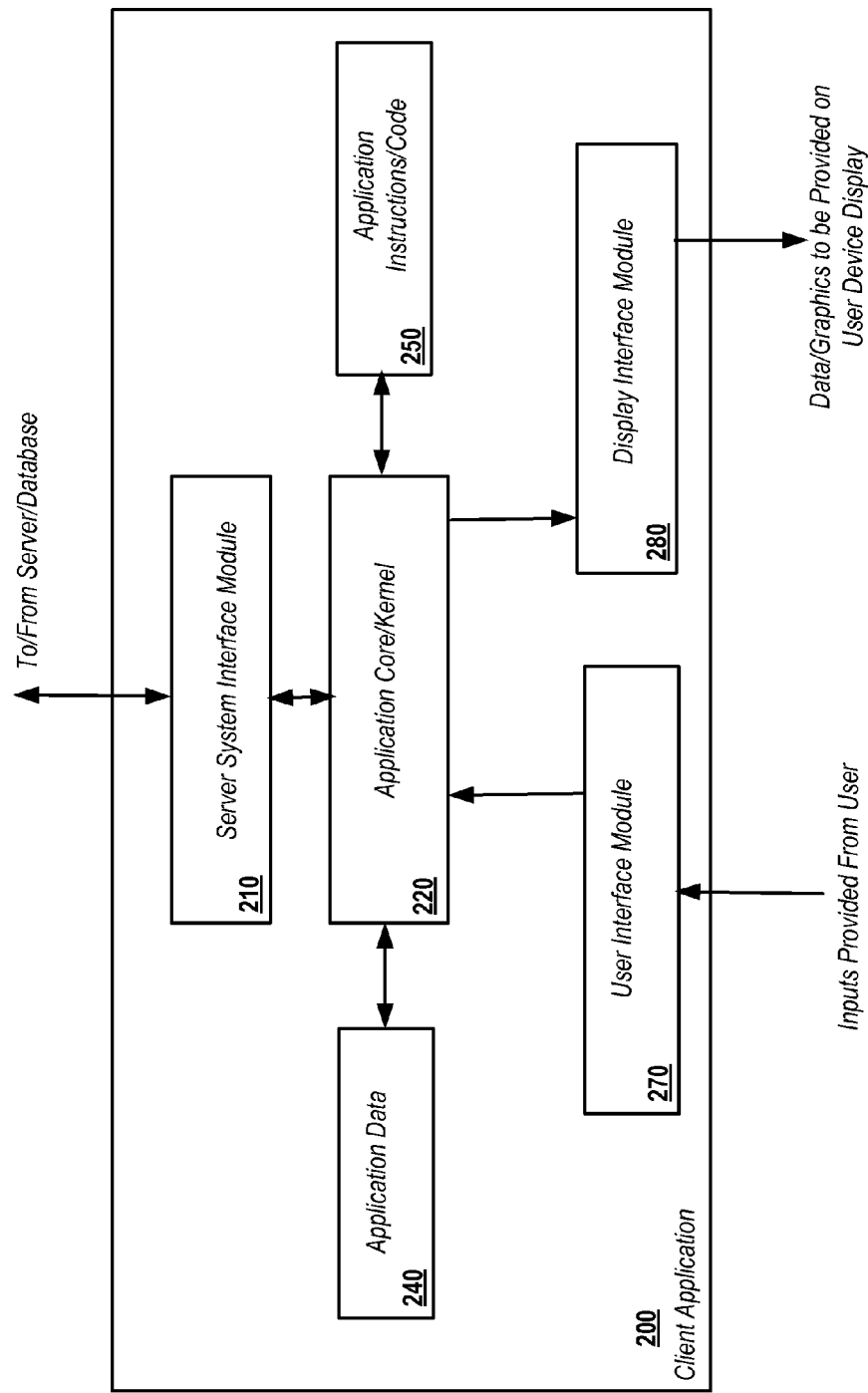
FIG. 2 illustrates details of an embodiment of an example client application for use on a user device.
Figure 3:
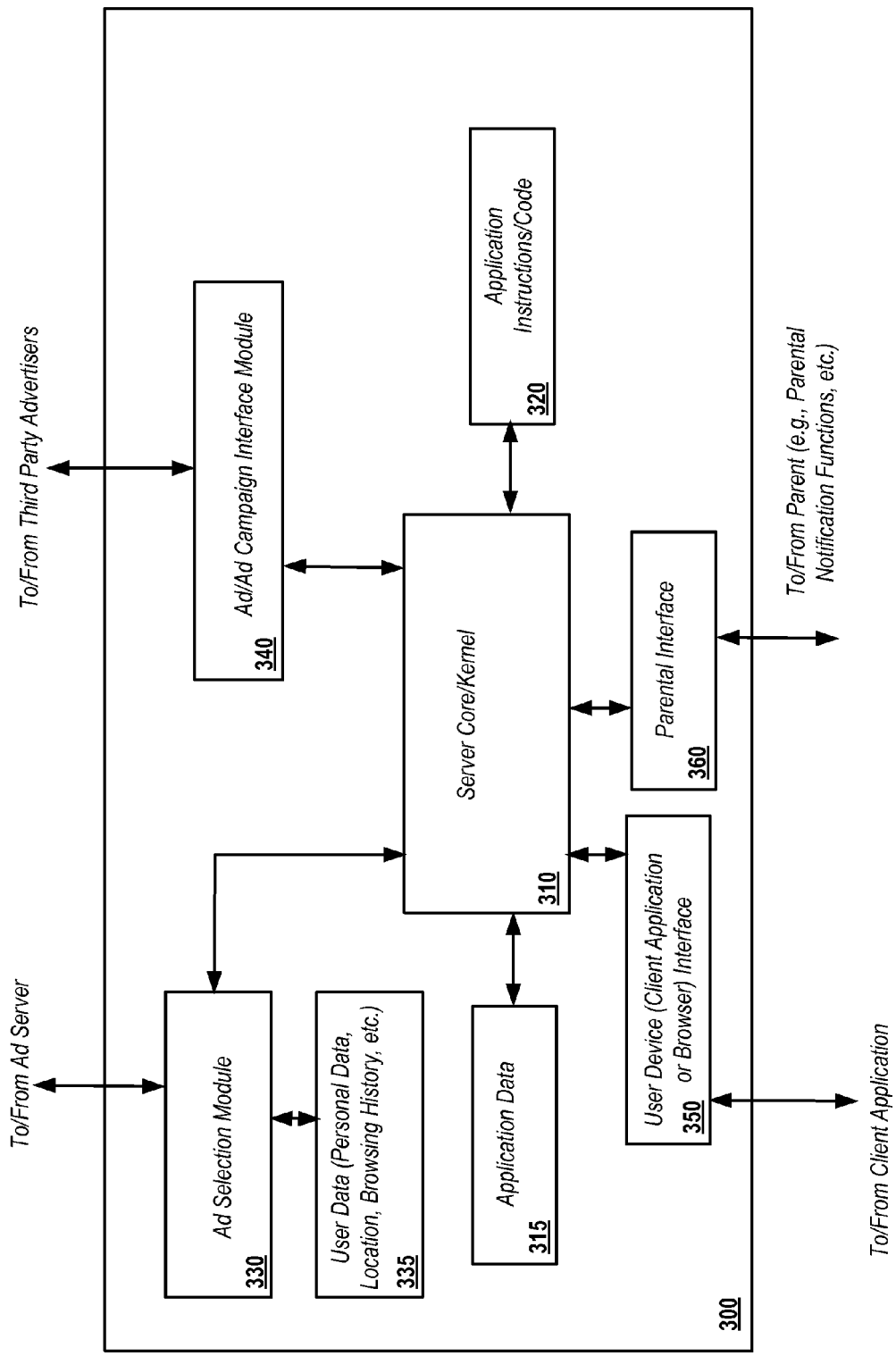
FIG. 3 illustrates details of an example server system for use with a client application such as shown in FIG. 2.

Before further describing various aspects and functionality of embodiments of the present invention, it may be helpful to describe the general context and systems and devices on which embodiments may be implemented as shown in FIGS. 1 through 3.

For example, FIG. 1, illustrates details of a system 100 on which various embodiments may be implemented. System 100 includes one or more (typically many) User Devices 110, which may be desktop or notebook computers, netbooks, smart phones, personal digital assistants (PDAs), tablets, or other similar or equivalent devices. As shown in FIG. 1, user device 110A includes a client application 120, which may be a customized application, such as described in the Related Applications, to provide access to a central server system such as Server System 140 (also denoted as a Kidzui System or Kidzui Core based on a specific implementation by the assignee of the instant application). User device 110B may be the same or similar device as that of device 110A except that it may use a standardized web browser application 125, such as the Internet Explorer, Firefox, or Chrome browsers. Either user device 110A or 110B may communicate with the Server System 140 via connections 114A or 114B, via a network 130, such as the Internet and/or another network such as a cellular data network, further via a network interface 112 to server system 140.

Server system 140 may include or be connected to an ad server/database 160 via connection 142. The ad server 160 may be used to store and select ads or other data or information to provide to user devices 110. In addition, one or more parental interfaces 182 may be included to allow parents or others 180 in a supervisory position to access the server system 140 to control configurations and features and options associated with other users (such as their children, students, etc.). In addition, one or more third party interfaces 172 may be included to allow third parties 170, such as advertisers, to select and configure advertising campaigns and associated data or information. In some embodiments, an interface 162 may be included to allow the advertiser or other third party 170 to directly access the ad server 160 to upload and/or download advertising data or information.

Server system 140 will generally include one or more databases or other data storage devices as well as associated hardware, software, memory, peripheral interface devices, and the like, including modules to receive and store data and information, receive and process input from user devices and associated browsers or client applications, receive and configure information from parents or other supervisors, as well as receive and configure third party information such as ads, ad campaign information, usage metrics such as impressions, clicks, click-throughs, etc. as well as provide other functionality such as is described in the Related Applications.

The data and information stored on the server system 140 may be data and information associated with multiple users and there parents or others in familial, supervisory, or friend relationships, as well as multiple advertisers. Each user and advertiser's data may be further subdivided into data associated with campaigns, such as advertising campaigns, web metrics, sales or user usage data, and/or other types of data or information.

At user device 110A, a client application program 120 may be downloaded and stored on the user device 110A to allow customized access to data and information on the server system 140. Alternately, or in addition, a standardized browser application 125 (as shown in user device 110B) may be provided to allow standardized web access and associated functionality in some implementations.

FIG. 2 illustrates details of an embodiment of a client application 200 and associated functional modules. Client application 200 may correspond with application 120 as shown in FIG. 1. Client application 200 may include a server system interface module 210 configured to provide an interface or data interchange with an associated server system, such as a server system 140 of FIG. 1. This interface functionality may be provided by other software and/or hardware modules in the particular user device, such as operation system functions, wired or wireless interface hardware and software, and the like. Application 200 may also include an application core or kernel module 220 configured to perform the basic functionality described subsequently with respect to client application and/or user device operation. In particular, this functionality may be as illustrated in FIGS. 4 through 8 as described subsequently herein. Client application 200 may further include an application data module 240 to store data associated with the client application, such as data inputted by a user, data being processed by the application core 220, data received from the server system or an ad server, and/or other data or information. In addition, client application 200 may include application instructions or computer code in a code or instruction module 250. The code or instruction module 250 may include a specific series of instructions and steps to perform the functions described subsequently herein. The computer code or instructions may be stored on a computer readable medium configured to provide instructions to a processor or other similar or analogous device, such as a programmable logic device, DSP, etc.

Client application module 200 may further include a user interface model 270 configured to receive input from a user, such as user selections, search data or information, or other information provided from a user such as a child. In addition, the client application module 200 may include a display interface module 280 configured to provide output information to a user on a display device (not shown) of a user device, such as an LCD or other display screen. The data may include information for selection by a user, such as input buttons, "Like" inputs, or other input mechanisms (such as touch screen functions, etc.). In addition, the data may include data to be displayed on the device such as ads, videos, graphics, text, etc. In addition, corresponding audio functions (not shown in FIG. 2) may also be provided with the client application.

FIG. 3 illustrates one embodiment of details of aspects of a server system 300, which may correspond with server system 140 as of FIG. 1. Server system 300 may include a core functional module or kernel 310, which may be configured as a module to control overall operation of the system as well as support functionality as described subsequently herein. Ad selection module 330 may be coupled to core module 310 to select targeted advertisements and/or other content for delivery to users and/or others (such as parents, relatives, teachers, etc.) as described subsequently herein. Ad module 330 may be coupled to a user data storage module 335 which may contain user data such as user ages, genders, preferences, interests, "Likes," browsing history, location information, and/or other information. In addition, ad selection module 330 may be coupled to an ad server, such as ad server 160 as shown in FIG. 1. As noted previously, the ad server 160 may be integral with server system 300 in some implementations.

Additional interface modules may be included in server system 300, either configured separate or integrated in functionality with other modules. For example, an Ad/Ad campaign interface module 340 may be included to allow access to advertisers to submit advertisements, ad campaign information, content, and/or other information. In addition, advertisers may be able to receive or access ad campaign data and metrics through interface 340. User may access the system through a user device interface 350, which may be operated in conjunction with a client application executing on a user device and/or a web browser. Parents or others associated with a user may access the system through a parental interface 360, and may further be provided with data, advertisements, content, and/or other information through this interface. Details of examples of parental information provision are describes subsequently herein.

Additional data storage modules may be separate or incorporated in other modules to store and provide data. For example, application data module 315 may store and provide data required for core functions as well as other functions executed on or in conjunction with the core modules, including the various functions described subsequently herein in conjunction with the appended drawings. A user data module 335 may store received or collected user data, such as personal information, age, gender, interests, browsing history, etc. This data may be used, as describes subsequently herein, to generate advertisements and other content for delivery to users and/or their parents or other associated persons. One or more application/instruction code modules 320 may also be included. These modules may comprise non-transitory computer-readable storage media, such as memory devices or other storage components to store instructions for execution by computer processors. The instructions may be used to implement the various functions described subsequently herein.

Figure 4:
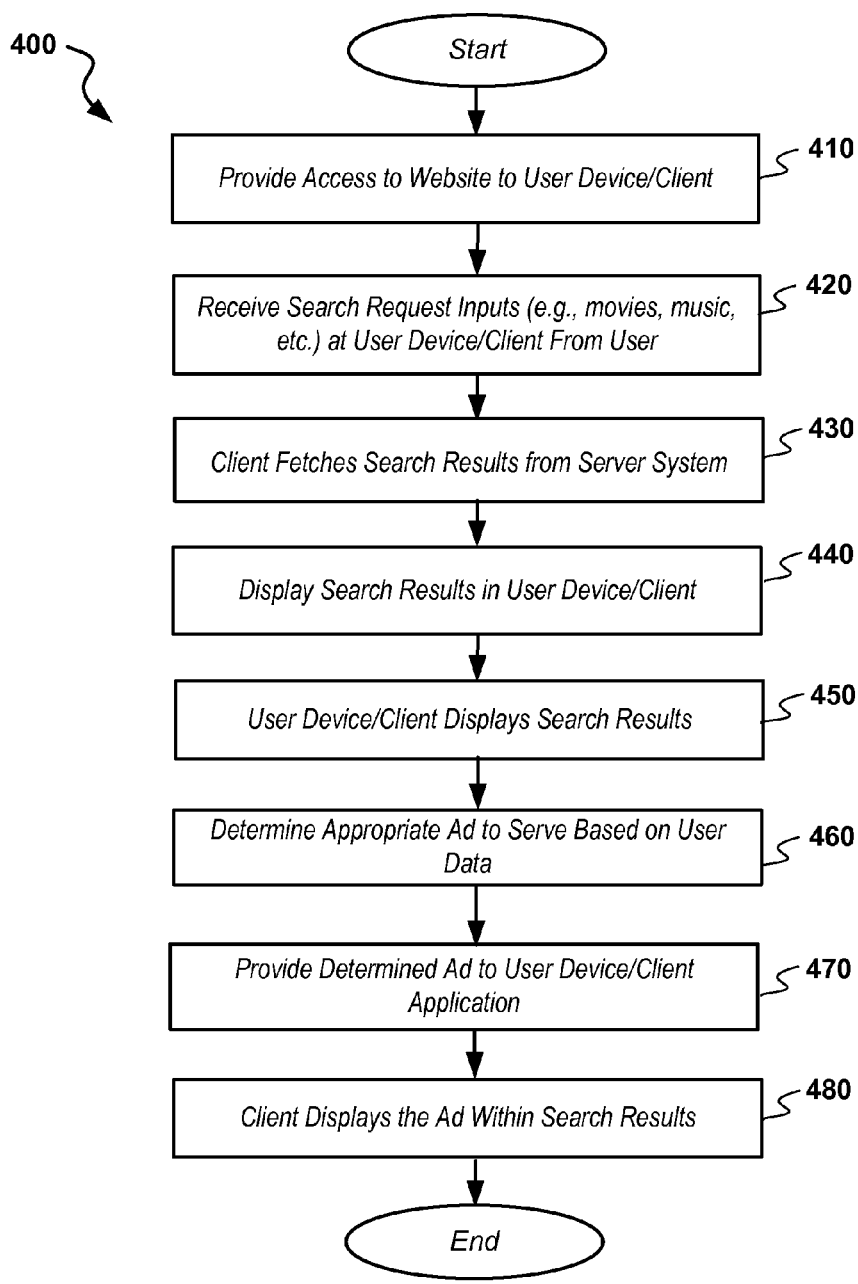
FIG. 4 illustrates details of an embodiment of a process for receiving user information and providing ads or other information or content.

FIG. 4 illustrates an embodiment of an example process 400 for receiving user information and providing advertisements and/or other information. At stage 410, a user, such as a child (e.g., a "child" may be a boy or girl between approximately the ages of 3 and 10, but may in some cases be above or below these age ranges) may be provided with network access, such as via a web interface. This may be done as described in, for example, the Related Applications. In some cases the web interface may be provided through a customized application such as application 120 of FIG. 1. Alternately, or in addition, web access may be provided via a browser such as browser 125.

At stage 420, the user device (and associated web browser or client application) may receive input from a user based on a particular user search criteria. For example, a user may search for a particular category of content, such as movies or television programs (e.g., videos).

At stage 430, the client application may generate a search query or may otherwise request or fetch content from a sever system. For example, user devices 110A or 110B may fetch search results from server system 140 as shown in FIG. 1 based on the requested search criteria (such as, for example, keywords, graphics, etc.).

At stage 440, the search results may be displayed on the user device, such as through a client application or browser window.

At stage 450, the user device (e.g., client application or browser request) may request an advertisement from the server system and/or ad server, such as ad server 160 as shown in FIG. 1 (which may be part of server system 140 or may be a separate system). The request may be routed through server system 140 if the ad server is a separate system. Included in the request may be information associated with the user, such as the user's age or age range, gender, keywords or other search terms or criteria, or other data or information). For example, the user information may be as follows:

age range 8-10;
gender male; and
keyword "movies."

At stage 460, the ad server determines an appropriate ad to serve. This may be based on various criteria such as the user information (e.g., age/age range, gender, keywords or other search criteria, etc.).

At stage 470, the determined ad is then returned to the user device for display. At stage 480, the user device displays the ad within the search results. For example, the ad may be displayed during playback rendering of the search results during particular times and/or at particular locations. In some cases, the ad may be displayed in a randomly selected position and/or time period in conjunction with the search results.

Figure 5:
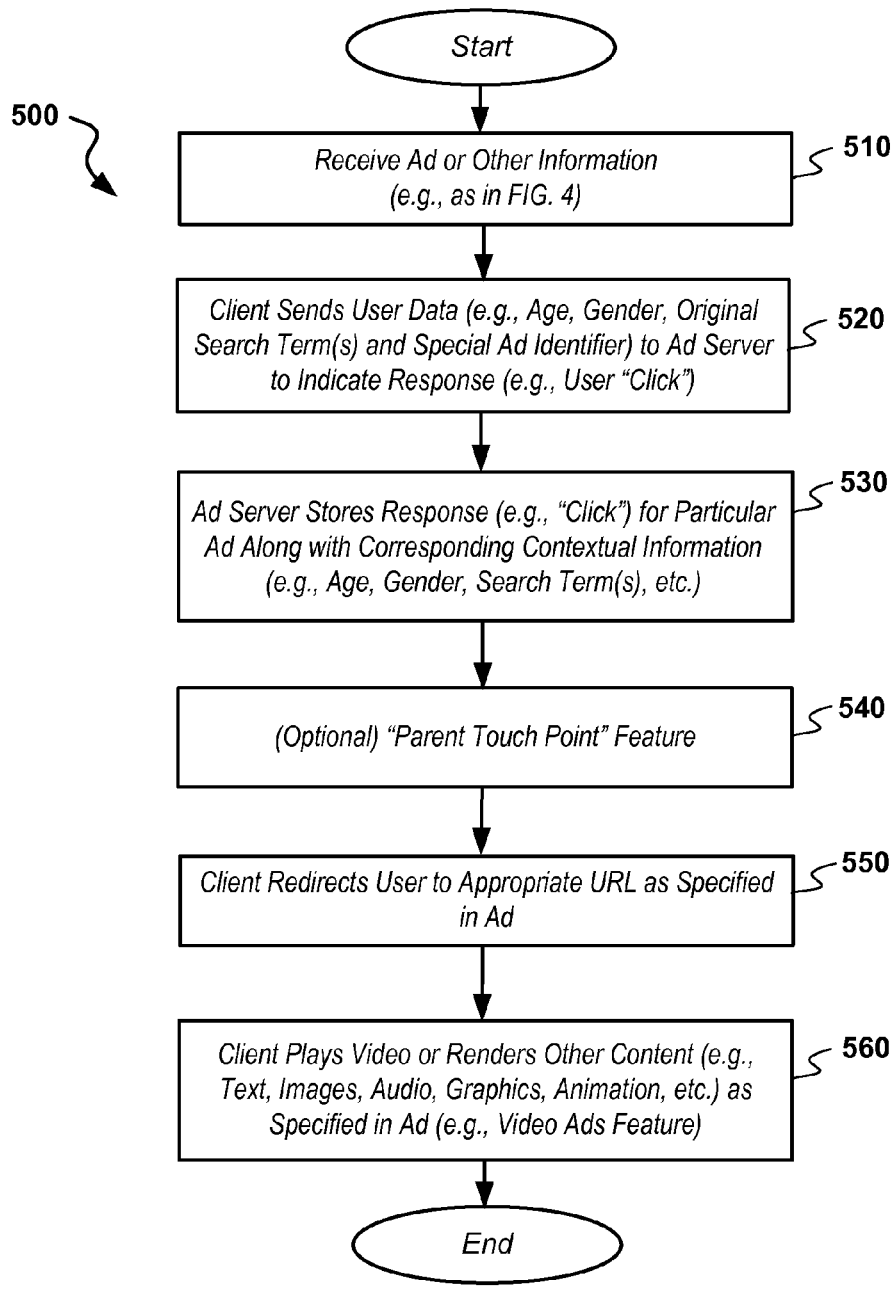
FIG. 5 illustrates details of an embodiment of a process for responding to served ads or other information.

Turning to FIG. 5, details of an embodiment of an example process 500 for receiving and responding to a served ad are illustrated. This process may be performed in conjunction with and/or sequentially with process 400 as shown in FIG. 4. For example, stage 510 may correspond with receiving an ad or other information as shown in FIG. 4. At stage 520, the user device/client may send a set of User Data such as, for example, age/age range information, gender, original search term(s), as well as a special ad identifier to identify the associated ad, and/or other information. The User Data may be sent to the server system and ad server to indicate user response to the served ad (e.g., a user "click" of the received ad to indicate user interest).

At stage 530, the server system/ad server may store a response associated with the advertisement (e.g., information associated with the user's "click" of the particular ad may be stored). In addition, contextual information associated with the ad, such as the User Data and/or other information associated with the user, as well as other information associated with the context of the ad delivery, may be stored. This stored information may be later used to provide advertising campaign data or information to a third part advertiser, develop ad provision and interest metrics, and/or provide other web analytic data or information.

In addition, a "Parent Touch Point" feature may be implemented at stage 540. This feature relates to notification of a parent, relative or friend, teacher, or other person in a supervisory capacity over the user. For example, a child user's parent or grandparent may be the person to be notified, and information associated with the child's particular interest in and/or usage of products or services associated with the ad may be stored and sent to the parent or other supervisory person, such as the child's teacher. Additional details of various implementations of this feature are provided subsequently herein.

At stage 550, the client application (or browser) may redirect the user to an appropriate URL as specified in the ad. For example, an appropriate web page associated with the ad may be displayed on the user device. At stage 560, the client may then play a video and/or render other context related to the selected ad. For example, a Video Ads Feature as described subsequently may be implemented at stage 560.

Figure 6:
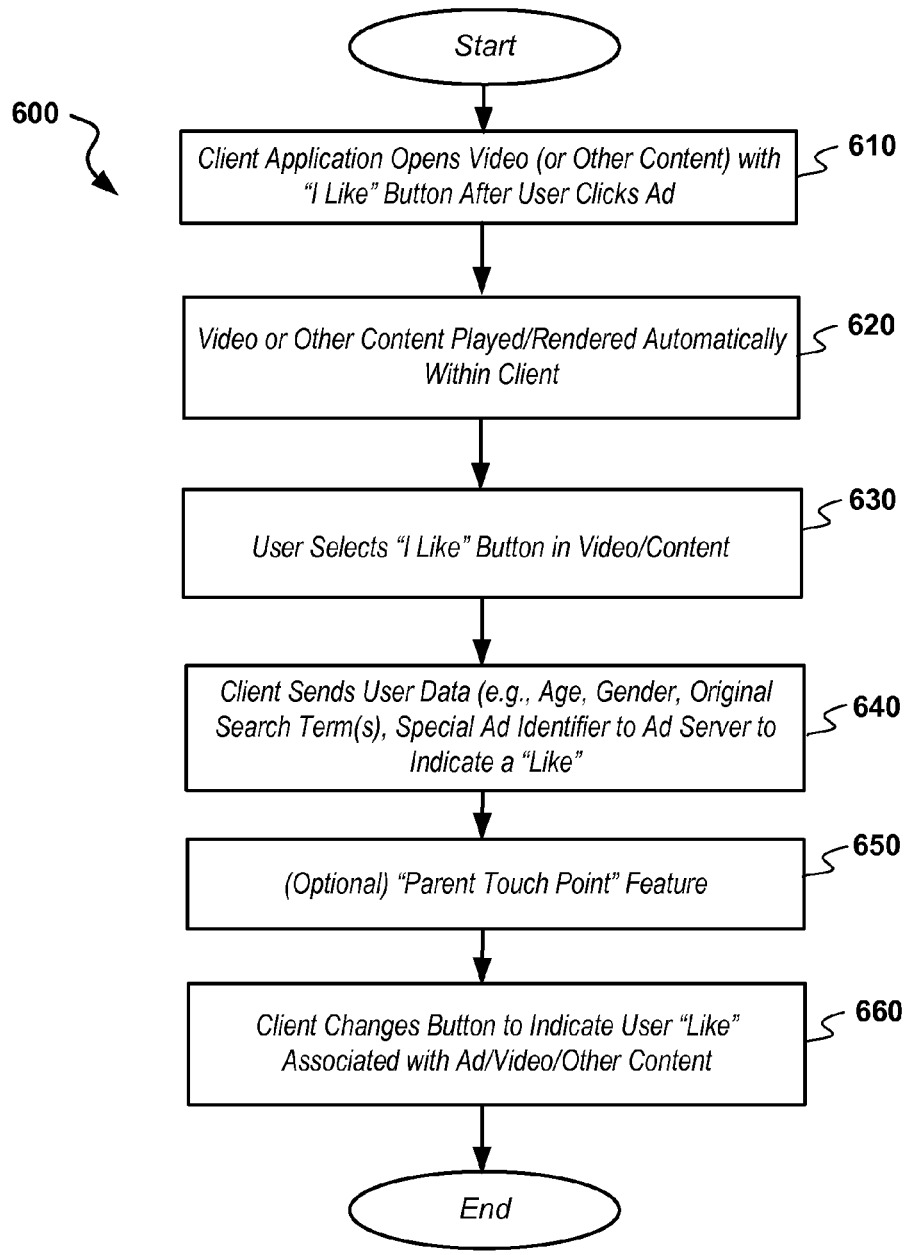
FIG. 6 illustrates details of illustrates details of an embodiment of a process for providing video ads and "Like" user inputs.
Figure 12:
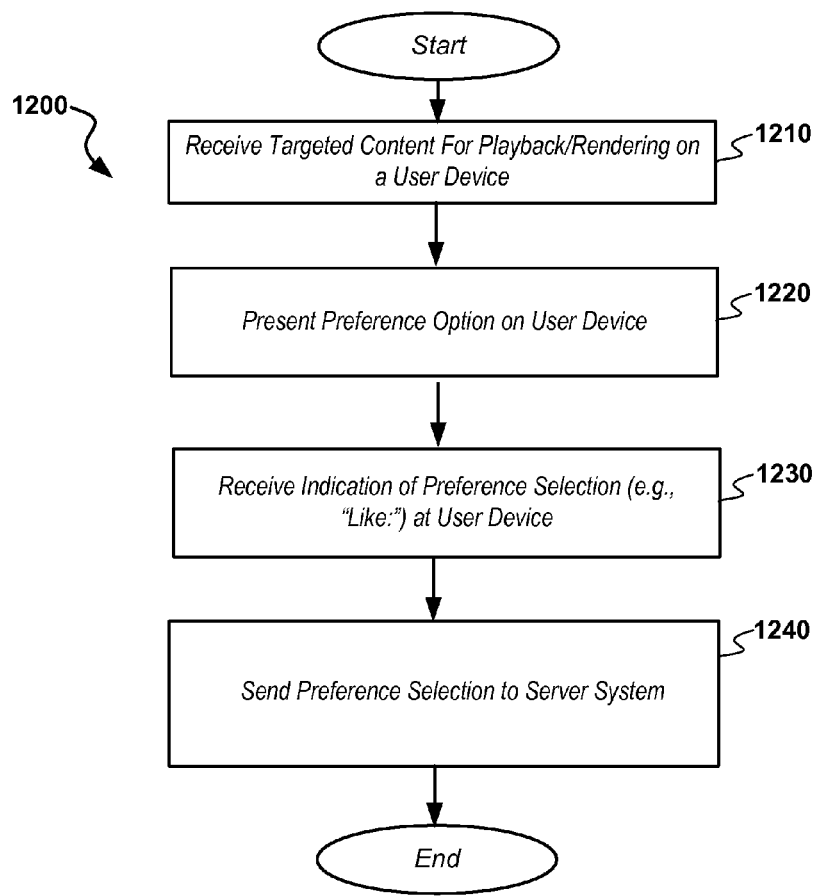
FIG. 12 illustrates details of an embodiment of a process for processing targeted advertising on a user device.

Turning to FIG. 6, details of an embodiment of an example process 600 for providing video ads and associated "Like" functions are illustrated. This process may be performed in conjunction with and/or sequentially with processes 400 and 500 as shown in FIGS. 4 and 5, respectively. For example, subsequent to processing as shown in FIG. 5, at stage 610 a client application (or browser) may open a video or provide other content. The video may include a "Like" function, such as shown in FIG. 12 and described subsequently herein. At stage 620, video or other content provided to the user may be played or rendered on the user device. This may be done in an automatic fashion upon receipt at the client device.

At stage 630, assuming the user liked the video or other content, he may be able to select, via a user interface, a "Like" or similar or equivalent function to indicate his or her preference of the content.

Upon receipt of the "Like" input, the process 600 continues to stage 640 where the client application may aggregate and send User Data, such as user age or age range, gender, originally provided search terms or other search criteria, as well as a special "Ad Identifier," which may be a number, string, or other mechanism to identify the particular served ad. By identifying the ad, information associated with provision of the ad may be collected, analyzed, stored, and provided to a third party such as the advertiser associated with the ad.

At stage 650, an optional "Parent Touch Point" feature, as described previously herein, may be implemented. This may be used to provide immediate and/or periodic reporting to a parent or other supervisory person associated with a child user regarding the user's interests and/or usage, including user selection of "Likes," as well as targeted advertising associated with the user's usage. This may include ads or other information directed to the parent based on specific user "Likes."

Finally, at stage 660, the client application may change the "Like" function to limit subsequent activation. For example the "Like" may be highlighted and user input prevented on the user device.

Figure 7:
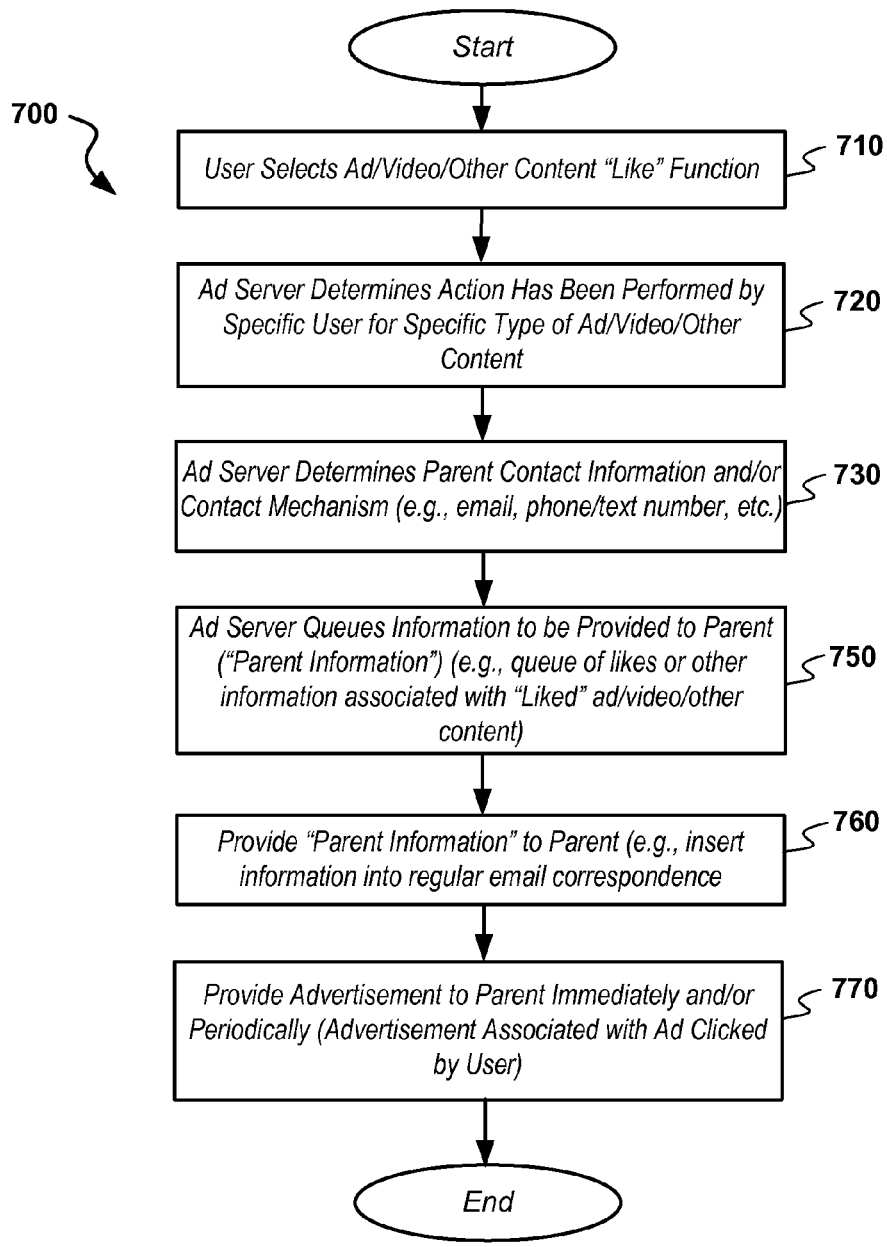
FIG. 7 illustrates details of illustrates details of an embodiment of a process for providing a "Parent Touch Point" feature to notify parents of a child's network usage and provide targeted advertising.

Turning to FIG. 7, details of an embodiment of an example process 700 for providing a "Parent Touch Point" feature as described previously herein are illustrated. This process may be performed in conjunction with and/or sequentially with processes 400, 500, and 600 as shown in FIGS. 4, 5, and 6, respectively. For example, once a user, such as a child, selects a "Like" function, such as shown in FIG. 12, at stage 710, an ad server, directly or in conjunction with a server system and the client application, may determine, at stage 720, that an action has been performed by the child user based on a specific type of ad/video/or other content. Based on this determination, at stage 730, parent contact information and/or contact mechanism may be determined. This may also be done for others associated with the user, such as a teacher or other person having supervisory authority over the child. For example, a parent may have contact information, such as a phone number (for direct calls and/or text messages), one or more email addresses, and/or other ways of being notified of associated child activities.

Information may be provided to the parent or other supervisory person in various fashions at stage 750. For example, the server system may include a configuration option to allow the parent to receive text messages right after child selection of a "Like" or other preference selection. Alternately, or in addition, the child's activities may be aggregated and provided to the parent in the form of a message, such as an email, periodically (for example weekly, monthly, etc.). This may be done by collecting child usage information in a queue and sending to the parent at a particular time and/or when a certain number of activities, such as a specific number of "Likes," have occurred.

At stage 760 the collected information may be sent to the parent or other supervisory person. In an exemplary embodiment, the information is aggregated and sent in an email message. In other embodiments the information may be sent to other electronic accounts, or to particular electronic devices, associated with the parent or other supervisory person.

In addition, at stage 770, advertising information associated with the user's activities may be sent. This may be done at or around the time of the user's selection, such as the user's selection of a "Like" function. Alternately, or in addition, advertising information may be included in a status email such as described in conjunction with stage 760, and sent to the parent. This function allows the parent to receive information and targeted advertising in direct response to a child's interests or preferences. For example, if a child "Likes" a particular video, an advertisement for a DVD or CD with similar or associated content may be provided to the parent.

Figure 8:
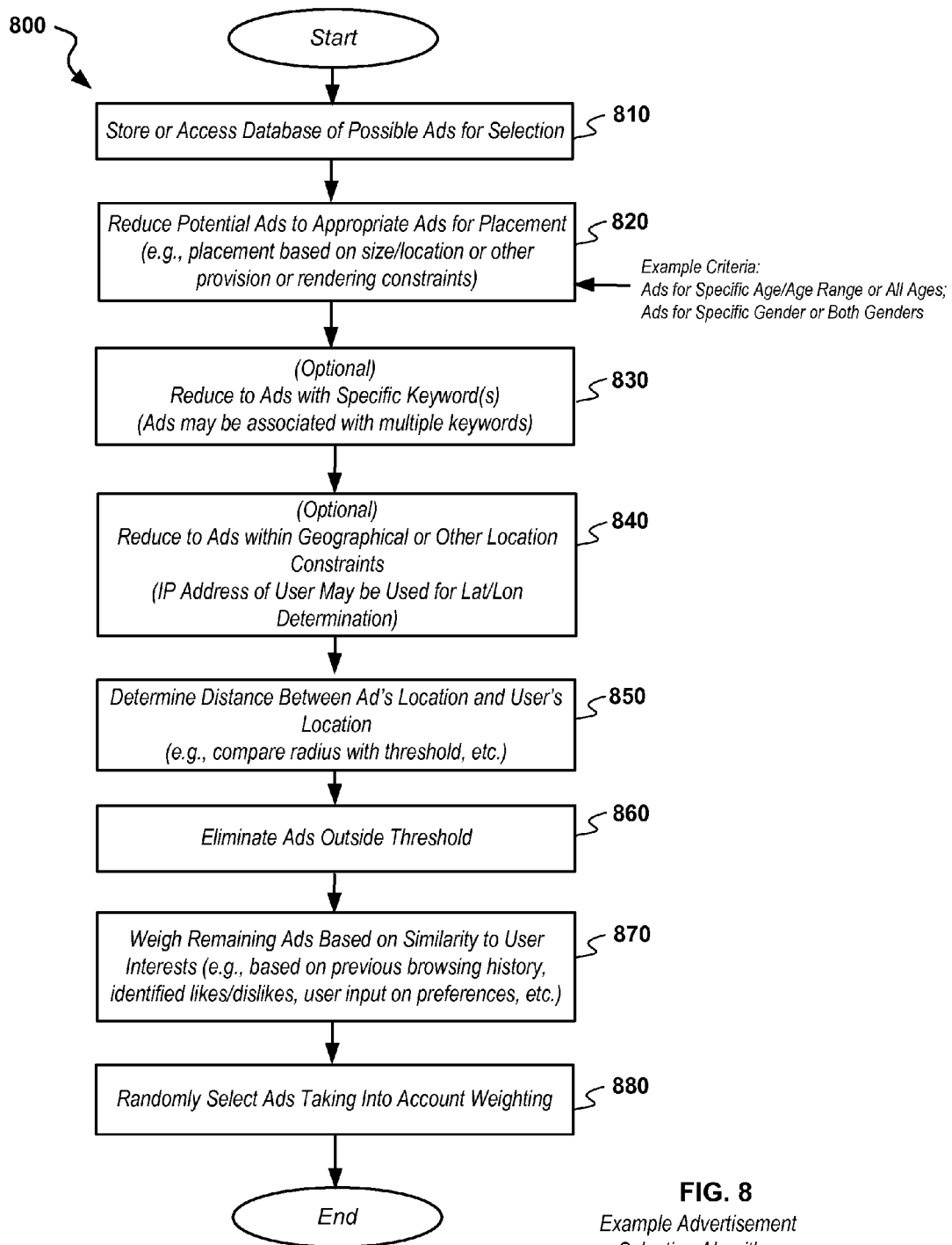
FIG. 8 illustrates an embodiment of an example process for selecting targeted advertising.

Turning to FIG. 8, details of an embodiment of an example process 800 for selecting targeted advertising are described. This process may be performed in conjunction with and/or sequentially with processes 400, 500, 600, and 700 as shown in FIGS. 4, 5, 6, and 7, respectively.

At stage 810, a selection of possible ads for providing to a user at the user's device may be stored in a database or otherwise made accessible. At stage 820, the aggregate collection of possible ads may be reduced to a subset of appropriate ads for potential provisioning to a user. This may be done by, for example, selecting a subset based on particular placement constraints associated with the user's device and/or planned placement of the advertisement, as well as based on other criteria such as user-specific data such as age/age range, gender, previously determined user preferences, and/or other user, user device, and/or system specific criteria.

At stage 830, the possible selection of ads may be further reduced based on specifically received user input, such as user provided keywords or other search criteria. This may be done using multiple keywords or other similar filtering mechanisms.

In addition, at stage 840, potential ads may be further restricted based on location or other geographic constraints. For example, an IP address or other information associated with the user (such as, for example, GPS information received from a smart phone or tablet device) may be used to map a user's location. At stage 850, a determination may be made as to whether a particular ad is appropriate given the user's location information. This may be based on a location radius or other geographic threshold. At stage 860, ads associated with features or other limitations based on geographic area may be further excluded.

At stage 870, the remaining ads may be further adjusted or weighted based on various criteria, such as known or predicted user interest (e.g., based on user input or past browsing history), identified likes or dislikes, or other user-specific information. At stage 880, a particular ad or ads may be selected. This may be done, for example, based on a random selection of the remaining ads and/or may include factors such as weighting done at stage 880.

In some implementations, other information may be used for content and/or ad selection. For example, demographic data may be collected and stored for multiple users and then classified into groups. In this case, information or other data associated with characteristics of these demographic groups (groups such as, for example, males within the ages of 8 and 10, or females of age 3) may be collected and used to further facilitate ad selection. Group interests, preferences, "Likes," etc. may then be used in the ad selection process, along with individual user information. For example, by having an individual user's information (e.g., boy, age 9, certain preferences, "Likes," past browsing history, etc.) and combining this information with aggregate demographic information for groups the child falls into, additional targeting selectivity for appropriate ads or content may be provided.

Figure 9:
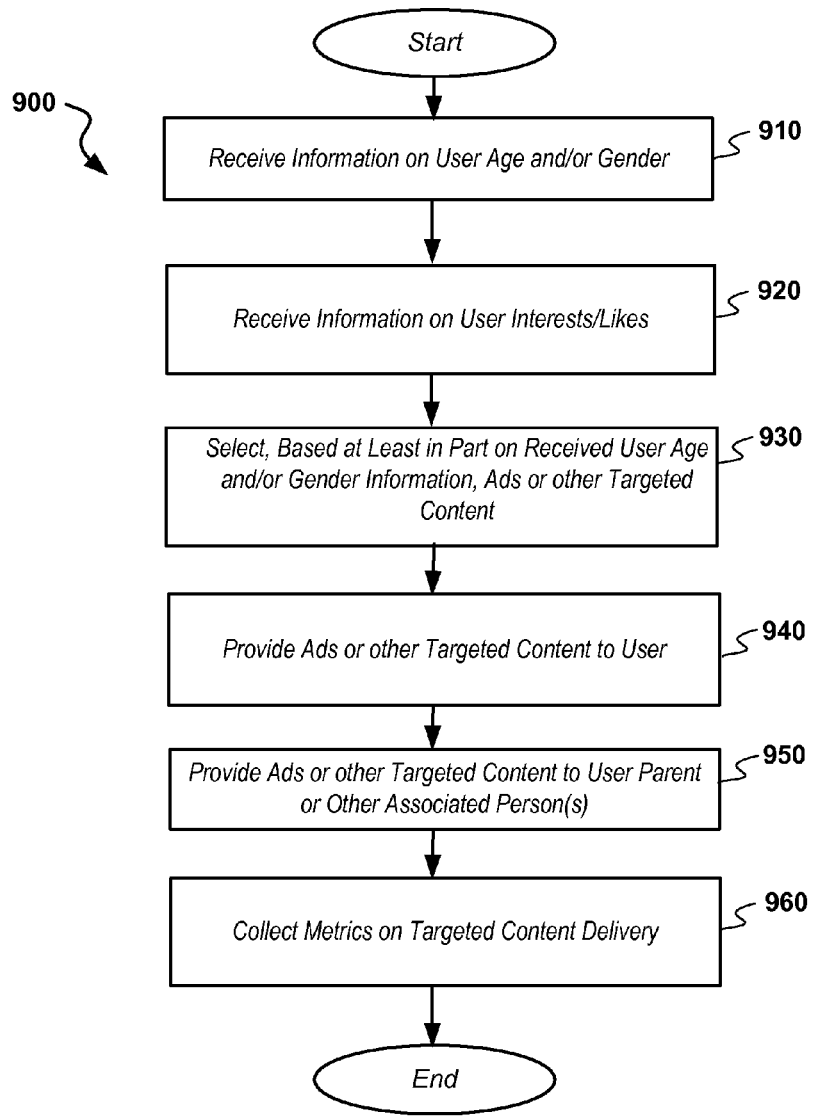
FIG. 9 illustrates details of an embodiment of a process for selecting age and/or gender specific targeted content.

Turning to FIG. 9, details of an embodiment of an example process 900 for selecting and providing targeted advertising are described. This process may be performed in conjunction with and/or sequentially with processes 400, 500, 600, 700, and/or 800 as shown in FIGS. 4, 5, 6, 7, and 8, respectively.

At stage 910, information associated with the age and/or gender of a user may be received, such as at a server system from a client application or browser executing on a user device, or from another source such as a parent or other person associated with the user from a computer or other device. In addition, in some implementations, information regarding user interests, preferences, likes or dislikes, etc. may be received at stage 920.

At stage 930, ads or other targeted content may be selected for delivery to the user and/or to the user's parent or other person associated with the user. The ads or other targeted content may be selected based on the received age and/or gender information. In addition, other information, such as the user's location, may be received or determined. This other information may also be used to select targeted ads or other content.

At stage 940, the ads or other targeted content may be provided to the user, such as, for example, by delivery to a user device associated with the user for display/playback on a client application or browser. Alternately, or in addition, at stage 950 the same or different ads or other targeted content may be provided to a parent, relative, friend, teacher, or other person associated with the user.

In conjunction with the processing described previously in process 900, data and other metrics associated with receipt and delivery of ads or other targeted contents to users and/or their parents or other persons may be received, stored, aggregated, analyzed, processed, and/or provided to third parties. For example, at stage 960, information may be collected in conjunction with one or more ad campaigns and provided to an associated advertiser or other third party. The stage of receiving, storing, aggregating, analyzing, processing, and/or providing data may likewise be used with previously described processes 400, 500, 600, and 700.

In addition, as described previously, group demographics may also be used in process 900 to further select targeted ads or other content (e.g., information associated with groups to which the user belongs may be further used to select appropriate content).

Figure 24:
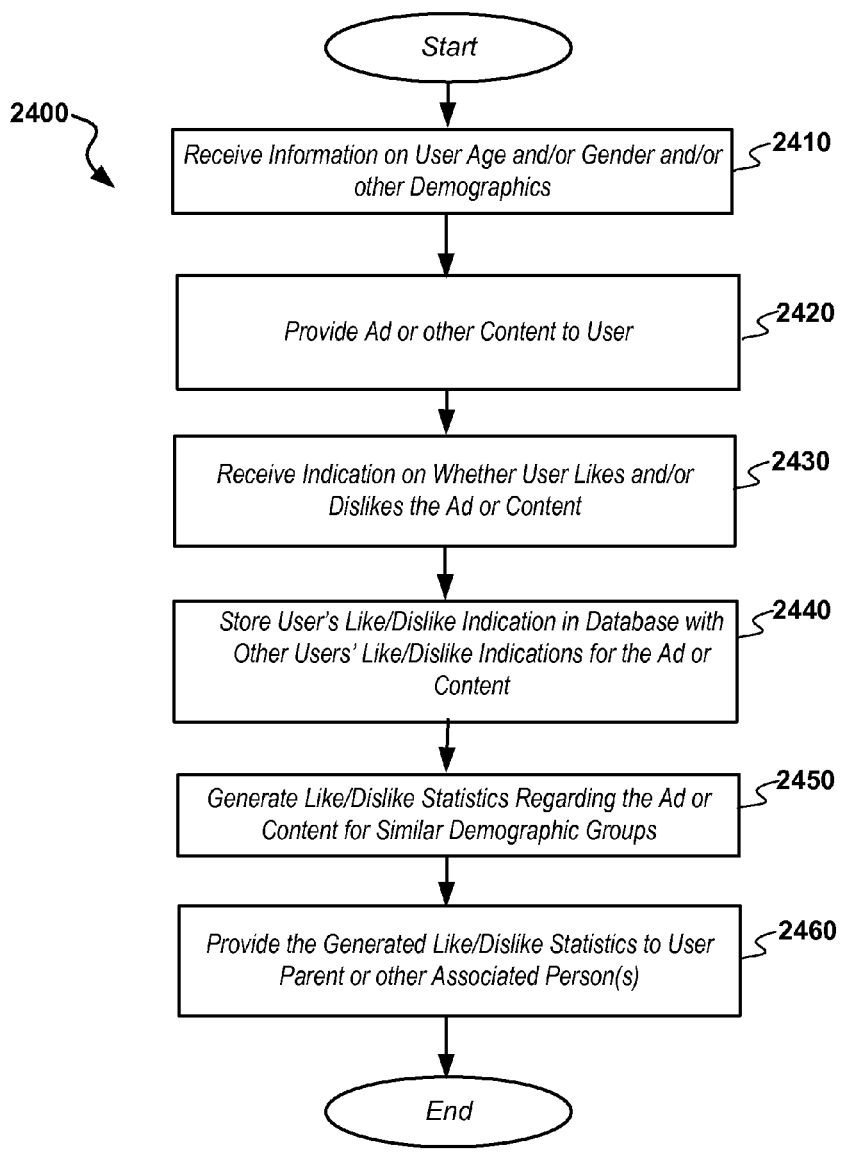
FIG. 24 illustrates details of an embodiment of a process for providing statistical information regarding likes/dislikes of ads or content for demographic groups.

Turning to FIG. 24, details of an embodiment of an example process 2400 for providing statistical information regarding product or content preferences specific to various demographic groups in order to facilitate, for example, the purchase of products by third parties (e.g., parents) on behalf of or otherwise for members of such groups (e.g., children). This process may be performed in conjunction with and/or sequentially with processes 400, 500, 600, 700, 800 and/or 900 as shown in FIGS. 4, 5, 6, 7, 8 and 9 respectively.

At stage 2410, information associated with the age and/or gender of a user may be received, such as at a server system from a client application or browser executing on a user device, or from another source such as a parent or other person associated with the user from a computer or other device. In addition, in some implementations, other demographic information regarding location, urban or rural home location, sporting interests, hobbies, race, religion, etc. may be received at stage 2410.

At stage 2420, an advertisement or other content relating to, for example, a product (including items of media content) or service, may be provided by an ad server for delivery to a device of a user. The ad or other content may be provided to the user, such as, for example, by delivery to a user device associated with the user for display/playback on a client application or browser. The ad or other content may have been selected based on the received age and/or gender information and/or the other demographic information. In one embodiment a "Like" and/or a "Dislike" button or other preference selection option is associated with the advertisement or other content or is otherwise rendered by the user's device in association with the advertisement or other content.

At stage 2430, the ad server receives an indication of whether the user likes and/or dislikes the advertisement or other content that was provided at stage 2420. The indication may result from, for example, the user selecting the "Like" or "Dislike" preference selection option rendered by the client application or browser executing on the user's device. At stage 2440, the ad server stores the Like/Dislike indication in a database along with the age, and/or gender, and/or other demographic information of the user. The database also stores Like/Dislike indications of other users in association with respective ones of the other users' age, and/or gender, and/or other demographic information.

At stage 2450, the ad server, or other server in communication with the ad server and/or the database, generates Like/Dislike statistics regarding the ad or other content for one or more demographic groups that are characterized by similar age and/or gender and/or other demographic characteristics of the user. For example, if the user is 10 years of age, the Like/Dislike indication of the user for the ad or product would be included in statistics for the ad or other content for a demographic group including 10 year olds. The statistics could indicate the percentage of individuals or the absolute number of individuals in the demographic groups that like and/or dislike the ad or other content.

At stage 2460, the ad server or other server provides at least a portion of the generated statistics regarding the advertisement or other content to the parent or other person associated with the user. The provided statistics for the advertisement or other content could include any one or all of the demographic groups of which the user is a member. Such statistics could also pertain to demographic groups unrelated to the user. For example, continuing with the example in which the user is a 10 year old boy, if the advertisement relates to a product A having a popularity that is highest among 14 year old boys, then this statistical information could nonetheless be provided to the parent or other person associated with the user. The provided statistics could be in absolute terms (the total number of Likes/Dislikes in the particular demographic group) or relative terms (the percentage of users in the group that Like/Dislike the advertisement or other content relating to the product/service of interest).

In addition to providing statistics to a parent or other person associated with a user concerning a product advertisement viewed by the user, the provided statistics could also include statistics for other advertisements or content not viewed by the user that are nonetheless popular with demographic groups in which the user is not included. For example, with respect to an advertisement for a toy not viewed by a 10 year old male user, the child's parent may be sent an email message indicating that "[t]his toy is most popular for 9 year old boys". As another example, the parent could receive information relating to a toy found to be most popular among 7 year old girls. In this case the parent could then be spurred to purchase such toy for a niece of approximately the same age.

Figure 10:
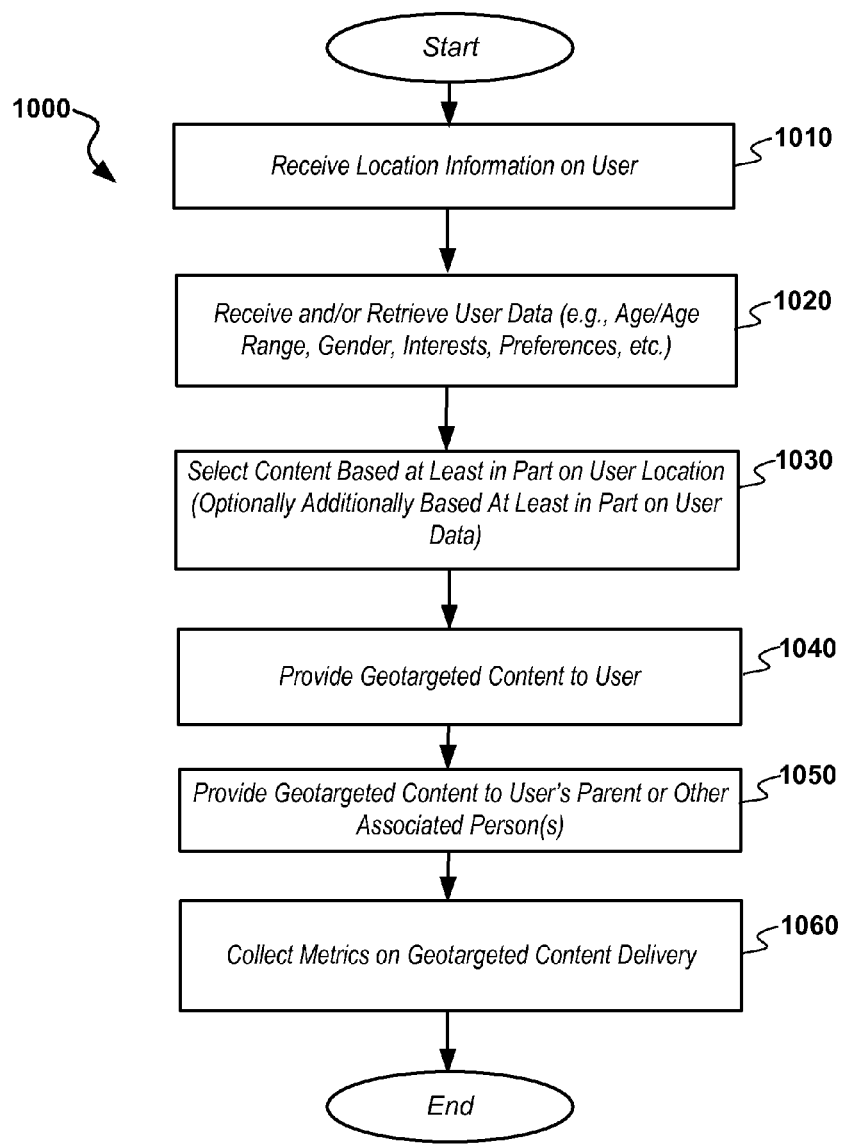
FIG. 10 illustrates details of an embodiment of a process for providing geotargeted content.

Turning to FIG. 10, details of an embodiment of an example process 1000 for selecting and providing targeted advertising using location information (e.g., geo-targeting) are illustrated. This process may be performed in conjunction with and/or sequentially with processes 400, 500, 600, 700, 800, and/or 900 as shown in FIGS. 4, 5, 6, 7, 8, and 9, respectively.

At stage 1010, information associated with a location of a user may be received or determined. For example, the information may be received from a user device associated with the user, such as via a GPS or triangulation function in the device. Alternately, the user's location may have previously been provided or may be determined based on IP addresses or other location mechanisms. In addition, in some implementations, user data and information, such as age/age range, gender, interests, preferences, "Likes," etc. may be received or retrieved from storage at stage 1020. At stage 1030, content, such as ads or other targeted content, may be selected based at least in part on the location information. In addition, the other user data and information may be further used to select targeted content.

At stage 1040, the targeted content may be provided to the user. For example, the content may be delivered to a user device associated with the user for display or rendering in a client application executing the user device.

In addition, in some implementations, the same or different content, such as the same or different ads may be sent at stage 1050 to another person associated with the user, such as a parent, relative, teacher, friend, or person in a supervisory capacity. In some implementations, data and other information metrics may be collected and used at stage 1060, such as described previously with respect to stage 960 of FIG. 9.

In addition, as described previously, group demographics may also be used in process 1000 to further select targeted ads or other content (e.g., information associated with groups to which the user belongs may be further used to select appropriate content).

Figure 11:
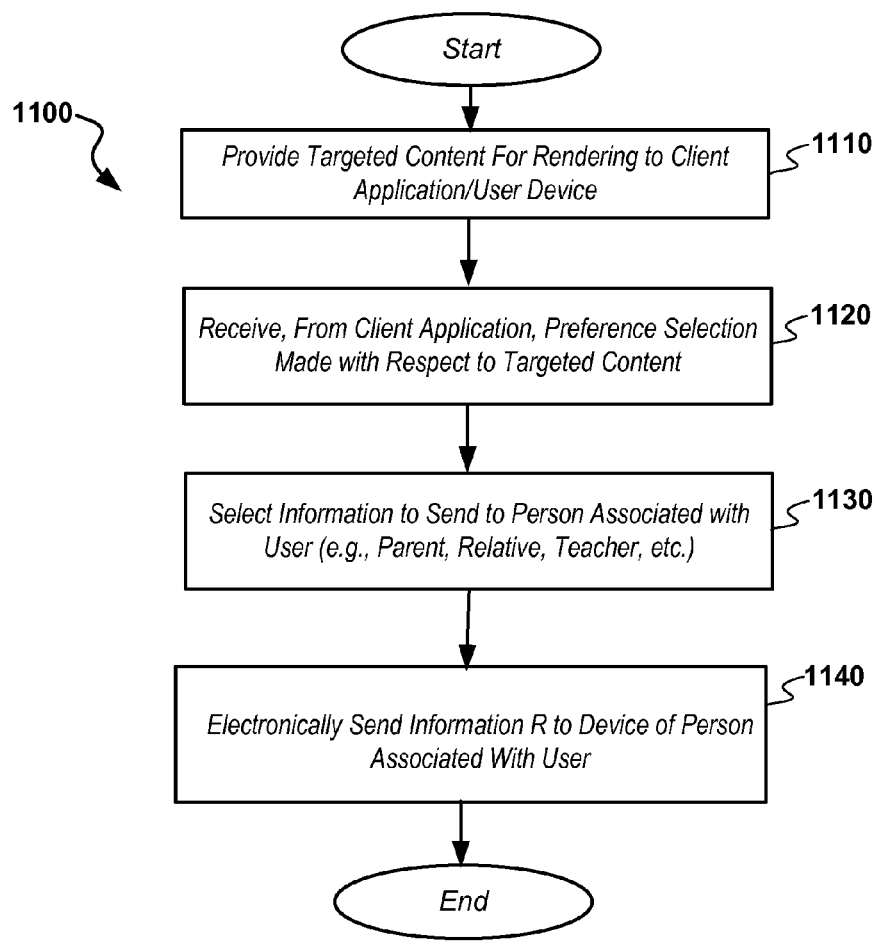
FIG. 11 illustrates details of an embodiment of a process for providing targeted content from a server system.

FIG. 11 illustrates details of an embodiment of an example process 1100 for selecting and providing targeted advertising and/or other content from a server system. This process may be performed in conjunction with and/or sequentially with processes 400, 500, 600, 700, 800, 900, and/or 1000 as shown in FIGS. 4, 5, 6, 7, 8, 9, and 10, respectively.

At stage 1110, targeted content for rendering to a user may be provided, such as from a server system to a client application executing on a user device. At stage 1120, an indication of a preference selection made by the user with respect to the targeted content may be received from the client application. At stage 1130, information to be sent to a person associated with the user may be selected based at least in part on the preference selection, and at stage 1140, the selected information may be electronically sent to the person associated with the user.

The targeted content may include, for example, a preference selection option selectable by the user. The preference selection option may comprise a "Like" option. The information may include an advertisement selected based at least in part on the preference selection. The targeted content may comprise targeted advertising selected based on an input to the client application provided by the user. The targeted advertising may be associated with a video game. The targeted advertising may be associated with a movie or television program. The targeted advertising may be associated with a musical product. The targeted advertising may be associated with a social network function. The social network function may be a social network game or contest.

The information may include, for example, data concerning the user's usage of particular content from a website rendered by the client application. The data concerning the user's usage may include information relating to the user's usage frequency of one or more content items on the website. The data may include temporal usage information. The electronically sending may include sending the information immediately upon the receiving of the indication.

The electronically sending may include, for example, generating aggregated information by aggregating the information with other user information and sending the aggregated information. The user may be, for example, a child and the person associated with the user is a parent.

The process 1100 may further include, for example, receiving information associated with the age of the user, and selecting the information to be sent to a person associated with the user based in part on the age of the user. The process may further include receiving information associated with the gender of the user, and selecting the information to be sent to a person associated with the user based in part on the gender of the user. The process may further include determining a location associated with the user, and selecting the information to be sent to a person associated with the user based in part on the location.

The location may be determined, for example, based on a IP address associated with the user. The location may be determined based in information provided from the user. The location information may be determined based on GPS data or other electronic location information.

The process 1100 may further include, for example, receiving information associated with an age of the user, receiving information associated with a gender of the user, and selecting the information to be sent to a person associated with the user based in part on the age of the user and the gender of the user. Alternately, or in addition, the method may further include receiving information associated with a location of the user, and selecting the information to be sent to a person associated with the user further based in part on the location of the user.

The process 1100 may further include, for example, selecting additional information to be sent to the user based at least in part on the preference selection, and electronically sending the additional information to the user. The process 1100 may further include receiving information associated with an age of the user, receiving information associated with a gender of the user, and selecting the additional information to be sent to the user based in part on the age of the user and the gender of the user. Alternately, or in addition, the process may further include receiving information associated with a location of the user, and selecting the information to be sent to the user further based in part on the location of the user.

The process 1100 may further include, for example, receiving information associated with an activity being performed by the user, and sending the information associated with the activity to the person associated with the user. The activity may be playing a game, such as an electronic video game. The activity may be viewing a movie, such as a movie or other video content rendered on a user device. The activity may be listening to music, such as music rendered on the user device. The activity may be interacting with educational content, such as education content provided on the user device. The educational content may be an educational software application or other widget or program played on the user device.

In addition, as described previously, group demographics may also be used in process 1100 to further select targeted ads or other content (e.g., information associated with groups to which the user belongs may be further used to select appropriate content).

FIG. 12 illustrates details of an embodiment of an example process 1200 for selecting and providing targeted advertising and/or other content from a server system. This process may be performed in conjunction with and/or sequentially with processes 400, 500, 600, 700, 800, 900, 1000, and/or 1100 as shown in FIGS. 4, 5, 6, 7, 8, 9, 10, and 11, respectively.

At stage 1210, targeted content for rendering to a user may be received, such as at a client application or browser. The targeted content may include information defining a preference selection option, such as information defining or for use in implementing a box, button, or other interface element on a display or other element of the user device.

Process 1200 may further include, at stage 1220, presenting the preference selection on the user device. At stage 1230, an indication of a preference selection made by the user with respect to the preference selection option may be received, such as via an input interface of the user device. At stage 1240, the preference selection or information defining the selected preference may be provided to a server system. The preference selection may be configured so as to be usable by the server system to send, to a person associated with the user, information associated with the preference selection.

The preference selection option may comprise, for example, a "Like" option presented on the user device. The preference selection may be a "Like," and the information associated with the preference selection may be a targeted advertisement associated with the targeted content. The information associated with the preference selection may include an advertisement selected based at least in part on the preference selection.

The targeted content may comprise, for example, targeted advertising selected based at least in part on an input to the client application provided by the user. The targeted content may be associated with a video game. The targeted content may be associated with a movie or television program. The targeted content may be associated with a musical product. The targeted content may be associated with a social network function. The social network function may be a social network game or contest, such as Farmville.

The information may include data concerning the user's usage of particular content from a website rendered by the client application. The data concerning the user's usage may include information relating to the user's usage frequency of one or more content items on the website. The data may include temporal usage information.

The user may, for example, be a child, and the person associated with the user may be a parent, relative, friend, teacher or person of supervisory capacity.

Figure 13:
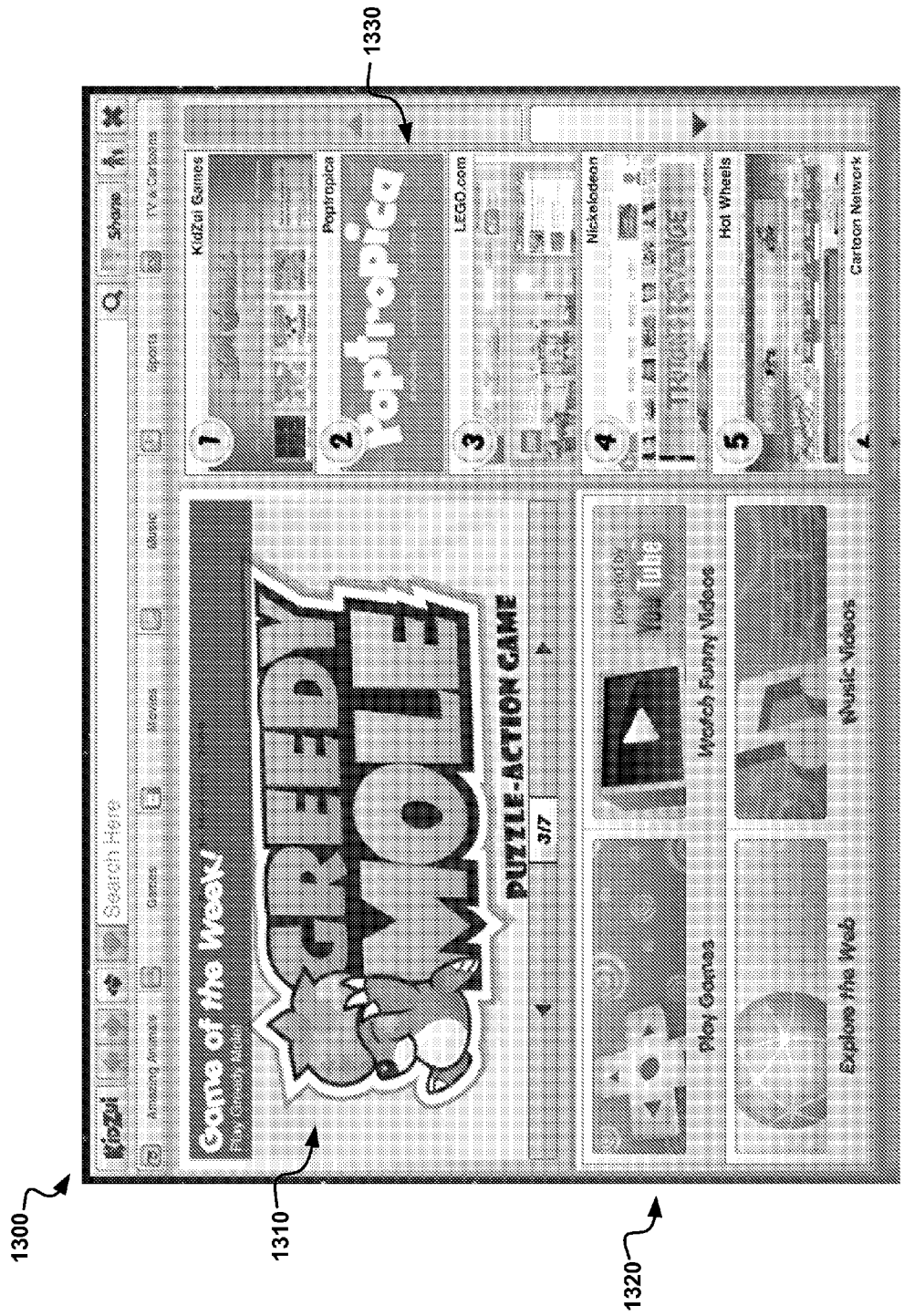
FIG. 13 illustrates details of an embodiment of a screenshot showing an example user screen with various user selection options.

FIG. 13 illustrates additional details of example screenshot 1300 and associated functions. Screenshot 1300 illustrates an example webpage as may be provided via a client application (such as applications 120 and/or 200 of FIGS. 1 and 2, respectively) or a browser, such as browser 125 of FIG. 1. The webpage may include various features, such as a highlighted game 1310, which the user may selection, as well as other options such as activity categories 1320 (e.g., games, music, videos, web search, etc.) as well as smaller specific selections 1330. This screen may be presented to a user in conjunction with functions described previously herein, such as with respect to process 400 of FIG. 4.

Figure 14:
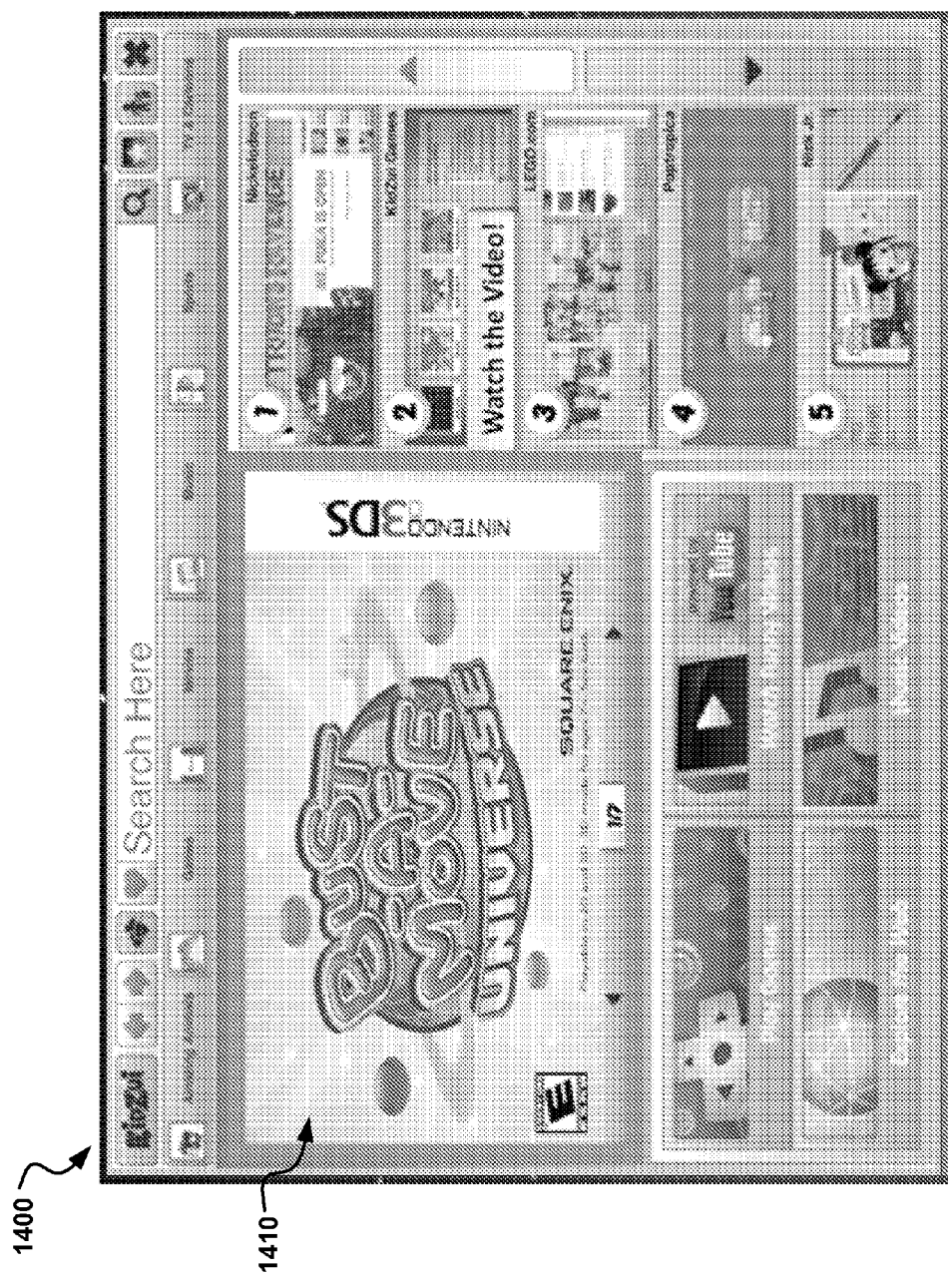
FIG. 14 illustrates details of an embodiment of a screenshot showing an example user screen with various user selection options including a game selection option.
Figure 15:
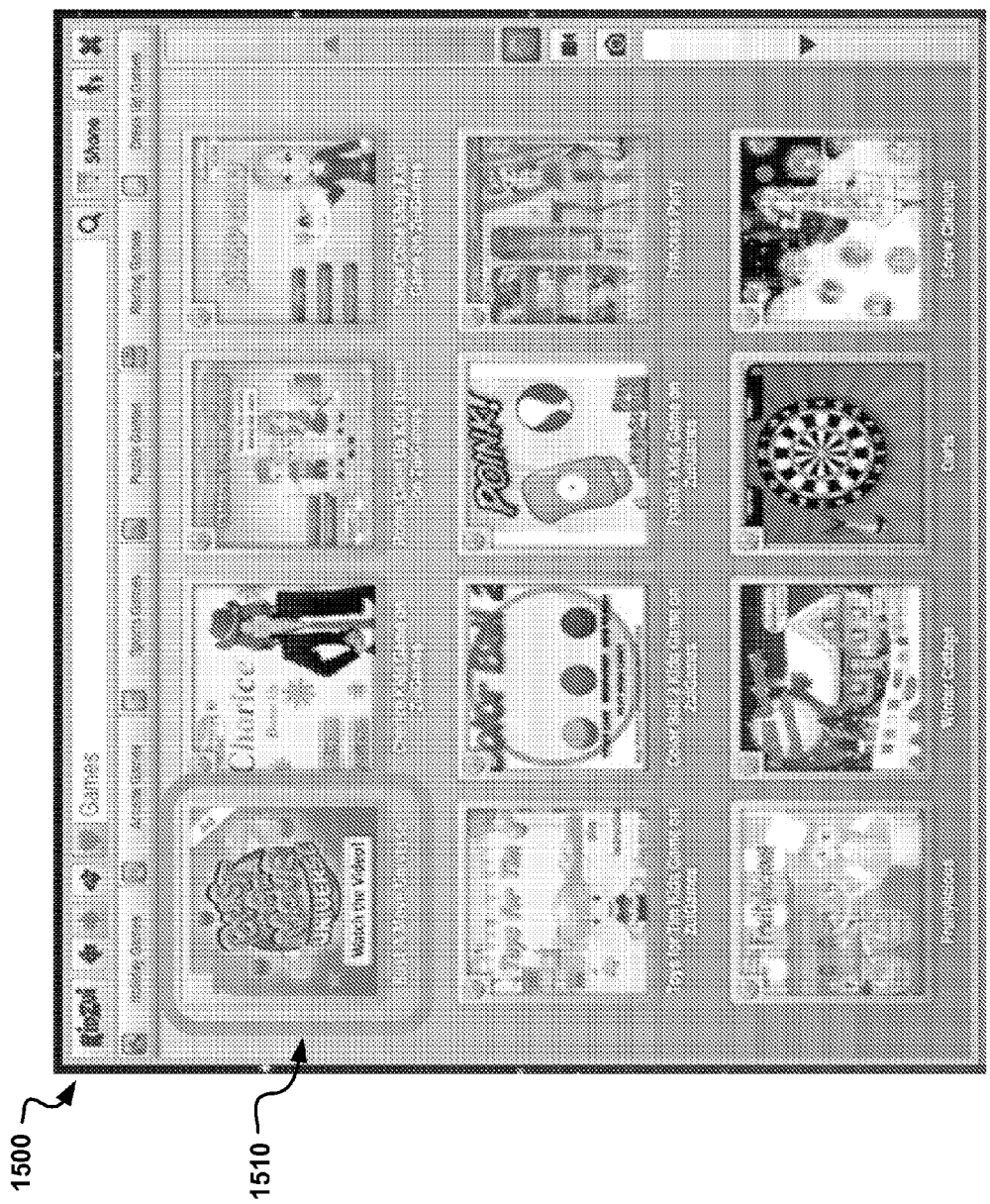
FIG. 15 illustrates details of an embodiment of a screenshot showing an example video advertisement for a game.

FIG. 14 illustrates another example screenshot 1400 and associated selection options. In this example, a user may be provided with a large game selection 1410, which may then further allow the user to see additional details and/or information associated with the option. FIG. 15 illustrates further details of this example, where a screenshot 1500 includes an advertisement 1510 associated with option 1410 of FIG. 14 is. By selecting the ad, the user may be presented with additional content, such as a video or videos, music, and/or other content or information. In particular, the selections shown in FIG. 15 may be further linked to targeted advertising as described previously herein.

Figure 16:
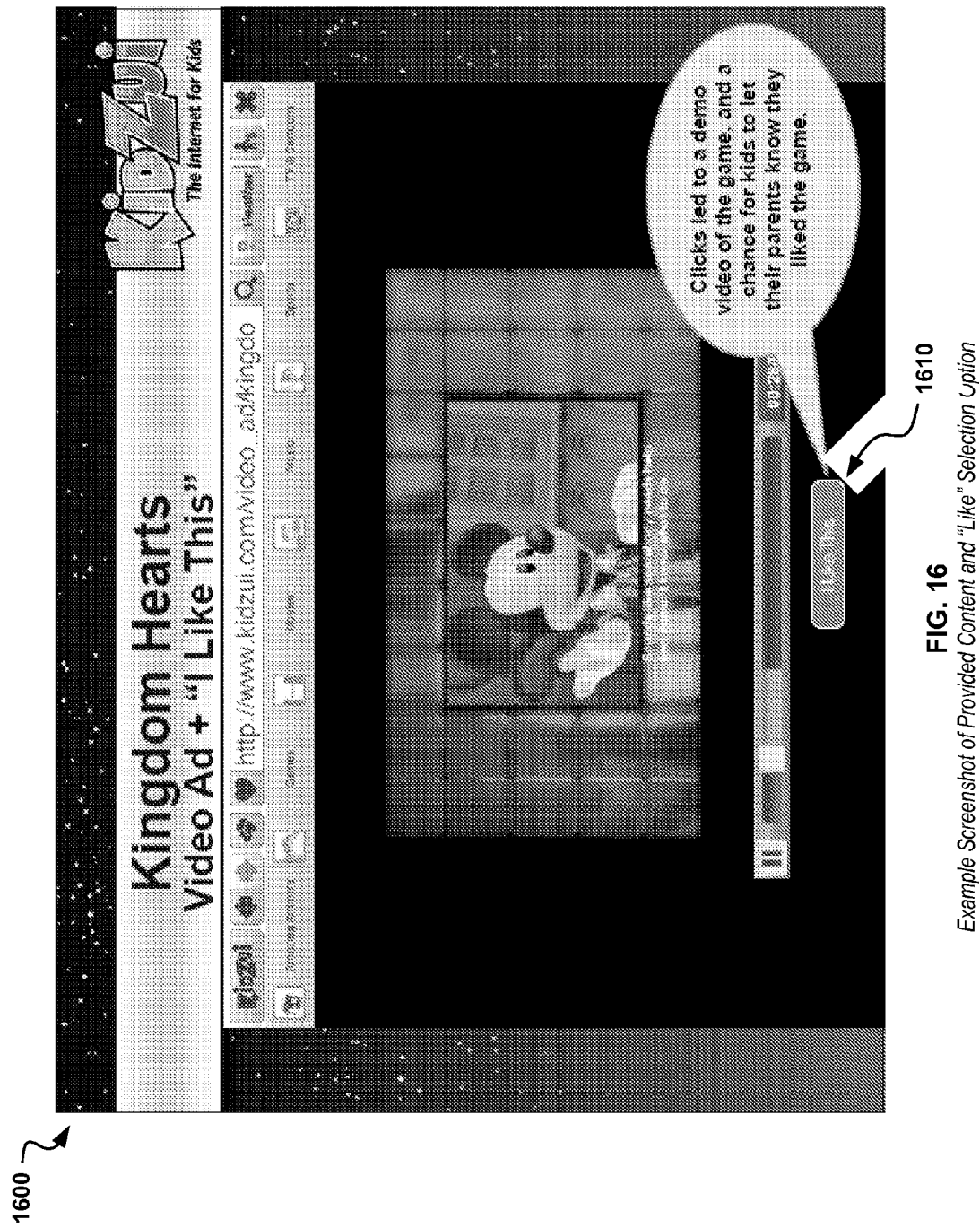
FIG. 16 illustrates details of an embodiment of a screenshot showing an example user screen with provided user content and a "Like" selection option for receiving user feedback.

FIG. 16 illustrates an example screenshot 1600 associated with a particular game called "Kingdom Hearts," for which an advertising video or other content (such as, for example, a trial or limited version, audio, or other data or information) may be provided. In addition, screenshot 1600 illustrates a "Like" function 1610 input button. This button may be selected by a user to indicate his or her "Like" of the particular content. As described previously herein, selection of the "Like" function may then be used to generate information to be provided to a parent or other person having supervisory authority over the child. For example, as described with respect to FIG. 7, targeted advertising may be generated and sent to the parent based on the child's selection of the "Like" function.

Figure 17:
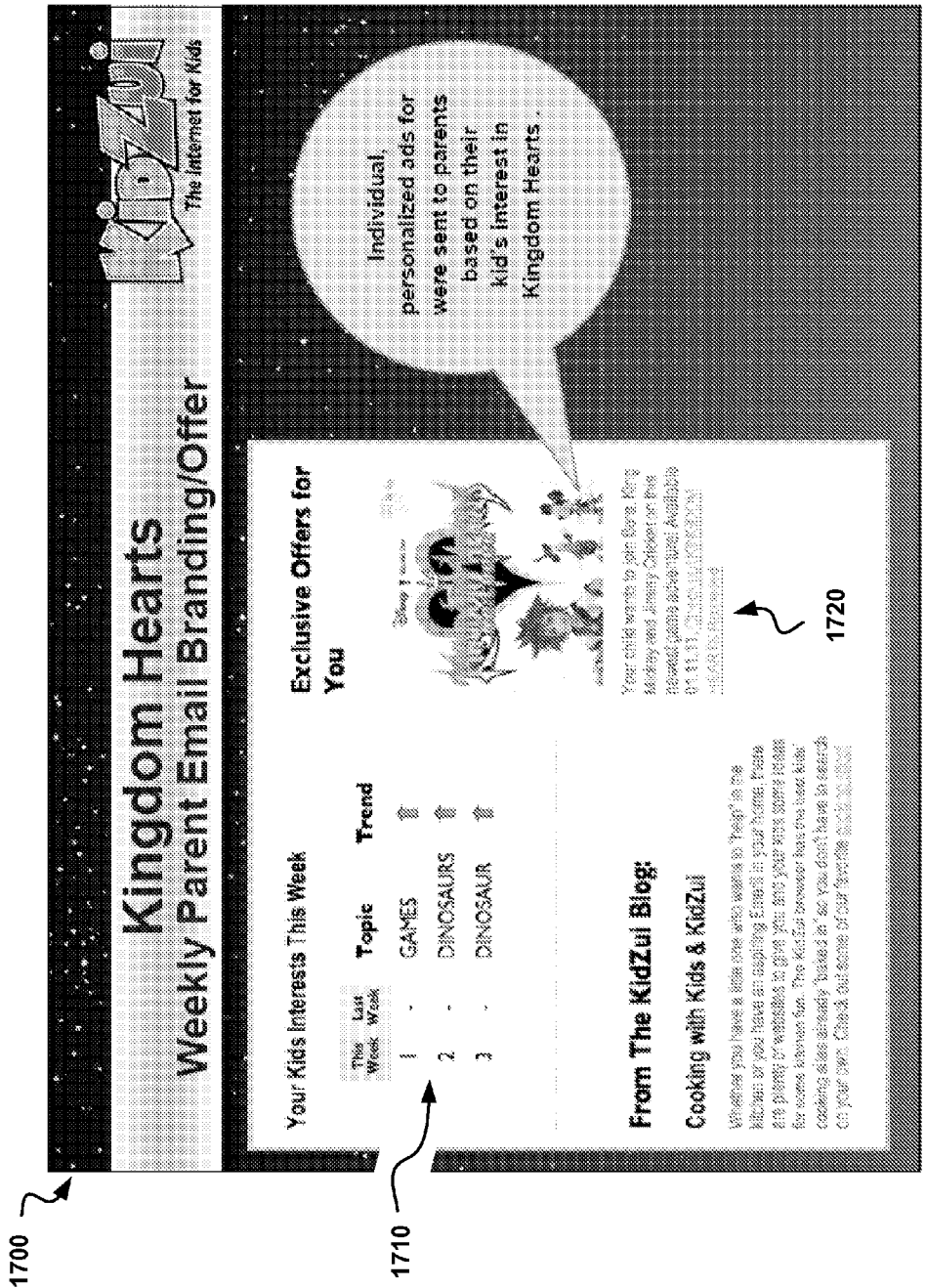
FIG. 17 illustrates details of an embodiment of a screenshot showing parental feedback and targeted advertising based on user input.

As noted previously, information associated with a child user's interests may be aggregated and sent to an associate parent or other person having supervisory authority. FIG. 17 illustrates a screenshot 1700 that includes an example of information that may be provided in an email or via other mechanisms (such as text messages, web page links, or other notification mechanisms). For example, information 1710 includes data associated with a child's usage of particular games or other activities during a particular time period (e.g., a week in this example, along with information for other temporal periods). Other information associated with the child's usage may also be provided, such as frequency of use, websites visited, and/or other information related to the child user's access to the system.

In addition, targeted advertising, such as advertisement 1720 of FIG. 17, may also be provided. For example, based on a child's interest in a particular game advertisement, a link or other information associated with a product may be provided in the email and/or separately.

Figure 18:
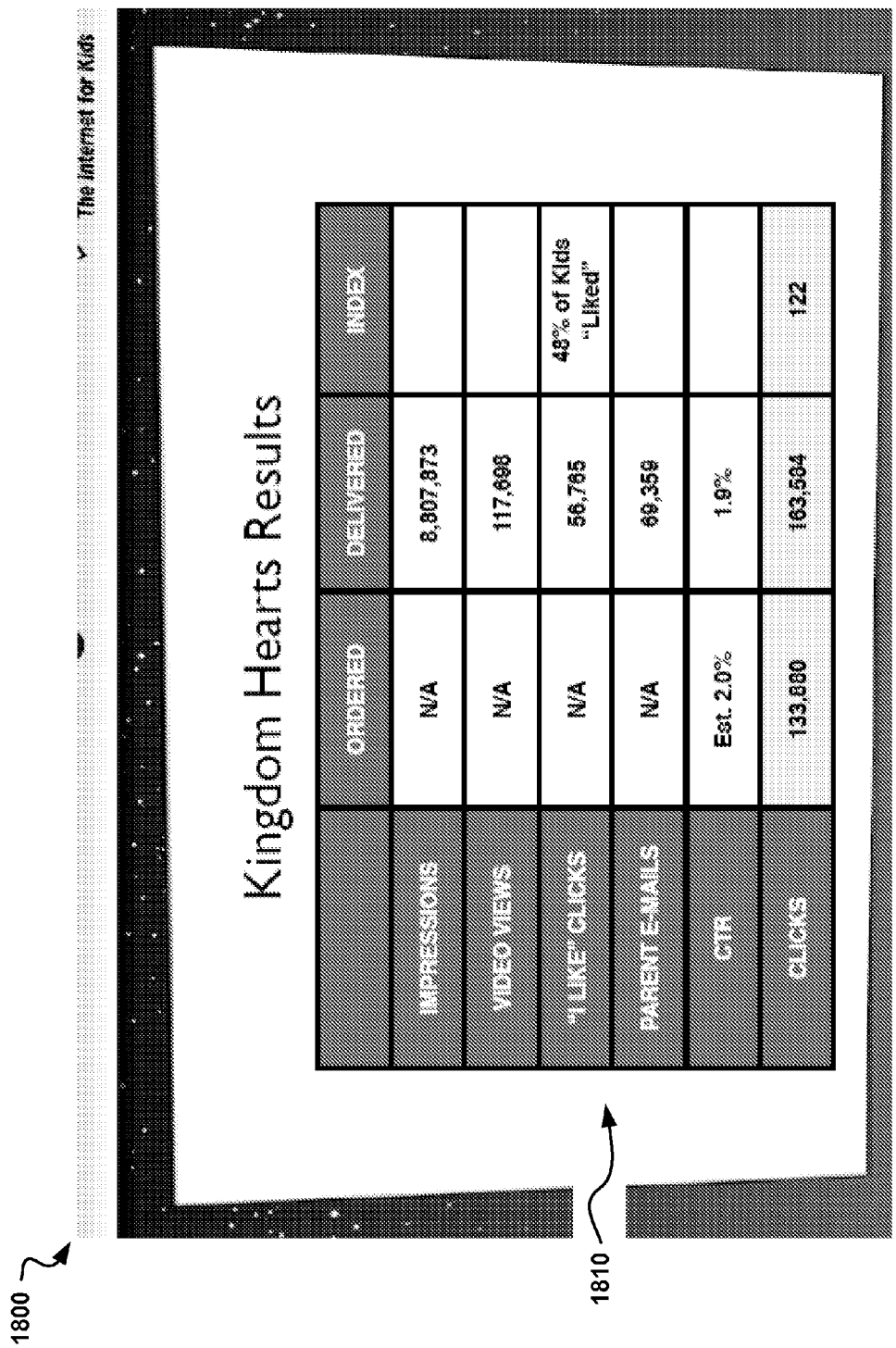
FIG. 18 illustrates details of an embodiment of a screenshot showing advertising campaign results.

In addition to providing parental information, additional data may be collected, stored, aggregated, processed, analyzed, and provided to others, such as third party advertisers. For example, as shown in FIG. 18, metrics associated with a particular advertisement or advertising campaign may be provided to the advertiser in screenshot 1800. In this case, data 1810 on child users' preferences may be collected and displayed as shown in FIG. 18. Data 1810 may include, for example, impressions delivered, views, "Like" selections, parental notifications/advertisements delivered, click-throughs, and/or other web analytics (not shown in FIG. 18).

Figure 19:
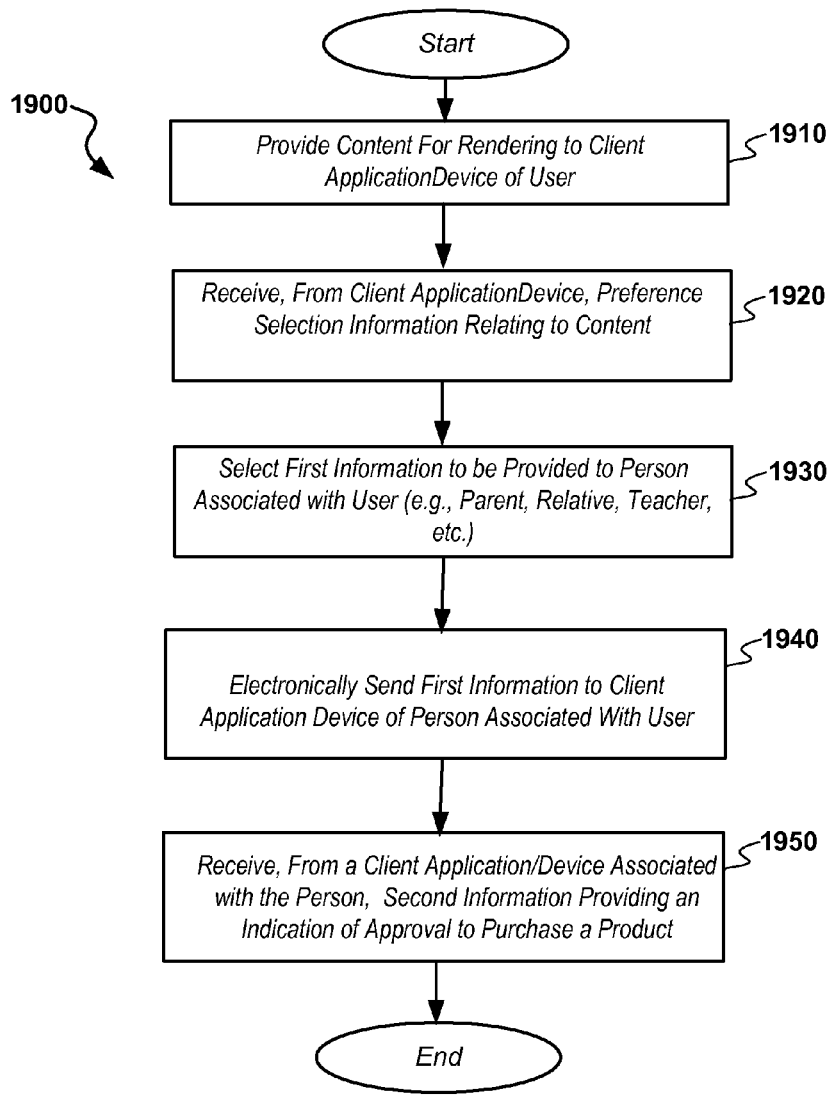
FIG. 19 illustrates details of an embodiment of a process for receiving approval to purchase a product from a person associated with a user of the client application.

FIG. 19 illustrates details of an embodiment of an example process 1900 for receiving, from a person (e.g., a parent of a user of a client application) approval to purchase a product associated with, or otherwise believed to of interest to, the user of the client application. This process may be performed in conjunction with and/or sequentially with processes 400, 500, 600, 700, 800, 900, 1000, 1100 and/or 1200 as shown in FIGS. 4, 5, 6, 7, 8, 9, 10, 11 and 12 respectively.

At stage 1910, a server system may provide content to a user device for rendering by a client application executing on the user device. The content may be targeted content identified using any of the methods described previously. At stage 1920, user preference information, and/or an indication of a preference selection made by the user, relating to potential purchase of a product associated with the content may be received from the client application. At stage 1930, first information relating to the product and/or its potential purchase is selected based at least in part on the user preference information and/or preference selection. At stage 1940, the first information may be electronically sent to a device accessible to the person associated with the user. At stage 1950, the server system receives second information providing an indication of approval (or disapproval) to purchase the product sent by the device. The indication may be generated by, for example, a separate client application executing on the device, an Internet browser, or by a "plug-in" or similar adjunct to an Internet browser.

The rendered content may include, for example, a preference selection option selectable by the user. The preference selection option may comprise a "Like" option, an "I Want This" option or an "Add to Cart" option. The first information may include an advertisement selected based at least in part on the preference selection. The content may comprise targeted advertising selected based on an input to the client application provided by the user. The targeted advertising may be associated with a video game. The targeted advertising may be associated with a movie or television program. The targeted advertising may be associated with a musical product. The targeted advertising may be associated with a social network function. The social network function may be a social network game or contest.

The first information may alternatively or additionally include, for example, data concerning the user's usage of particular content from a website rendered by the client application. The data concerning the user's usage may include information relating to the user's usage frequency of one or more content items on the website. The data may include temporal usage information. The first information may include data indicative of satisfaction or dissatisfaction with a product identified in the first information by a group of individuals that purchased the product. The group of individuals could be a group characterized by a gender and/or age. The electronically sending may include sending the first information immediately upon the receiving of the indication.

Figure 20:
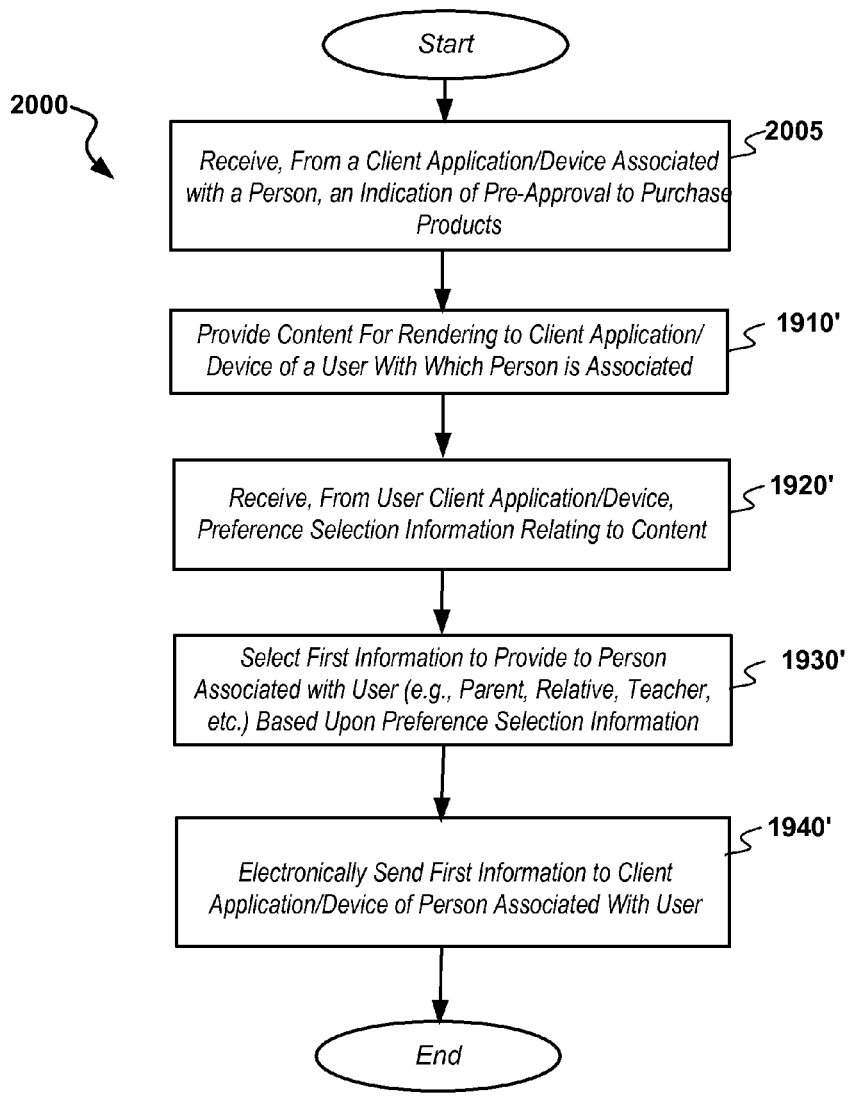
FIG. 20 illustrates details of an embodiment of a process for receiving pre-approval to purchase a product from a person associated with a user of the client application.

FIG. 20 illustrates details of an embodiment of an example process 2000 for receiving pre-approval for the user of a client application to purchase a product, the pre-approval being received from a person associated with the user (e.g., a parent of a child user). This process may be performed in conjunction with and/or sequentially with processes 400, 500, 600, 700, 800, 900, 1000, 1100, 1200 and/or 1900 as shown in FIGS. 4, 5, 6, 7, 8, 9, 10, 11, 12 and 19 respectively.

In one embodiment the process 2000 includes stages the same as, or substantially similar to, the stages 1910, 1920, 1930 and 1940 described above with reference to FIG. 19 (denoted as stages 1910', 1920', 1930' and 1940', respectively, in FIG. 20). However, the process 2000 includes a stage 2005 during which the server system receives pre-approval information permitting the user to purchase certain products. This pre-approval information may be received from a person associated with the user prior to the user indicating a preference to purchase the product (stage 1920'). The pre-approval information may comprise, for example, a pre-approval or other authorization to purchase a class of products. For example, a parent may pre-approve or otherwise authorize the purchase of books, educational media, etc. The pre-approval information may alternatively comprise a pre-approval to purchase products within a specified cost range or under a specified cost. In one embodiment the first information sent at stage 1940' can include an indication of what product was purchased based on the pre-approval provided by the person associated with the user at stage 2005.

Upon receiving approval to purchase a product from a parent or other person associated with the user at stage 1950 of process 1900, or if the selection received at stage 1920 of the process 2000 is for a pre-approved product, the server system can send a message indicating approval to purchase the product to the client application and/or the device associated with the person associated with the user. In addition, upon approval or pre-approval to purchase a product, the server system can automatically proceed to initiate the purchase transaction including determining a total cost (product price, shipping and handling, etc.) and in some embodiments, automatically charging a credit card or other account for the total cost. The credit card and/or account can be held by the user, jointly held by the user and the associated person or held by the person associated with the user. Upon the charge to the credit card or other account being approved, the product can be delivered and the person associated with the user can be sent a notice of completion of the purchase and a delivery estimate. Alternatively, the server system could forward the purchase information to a third party to handle the purchase transaction including determining the cost, charging of costs and delivery of the product.

Figure 21:
FIG. 21 illustrates details of an embodiment of a screenshot showing an example of a user screen offering a product for selection to purchase.
Figure 22:
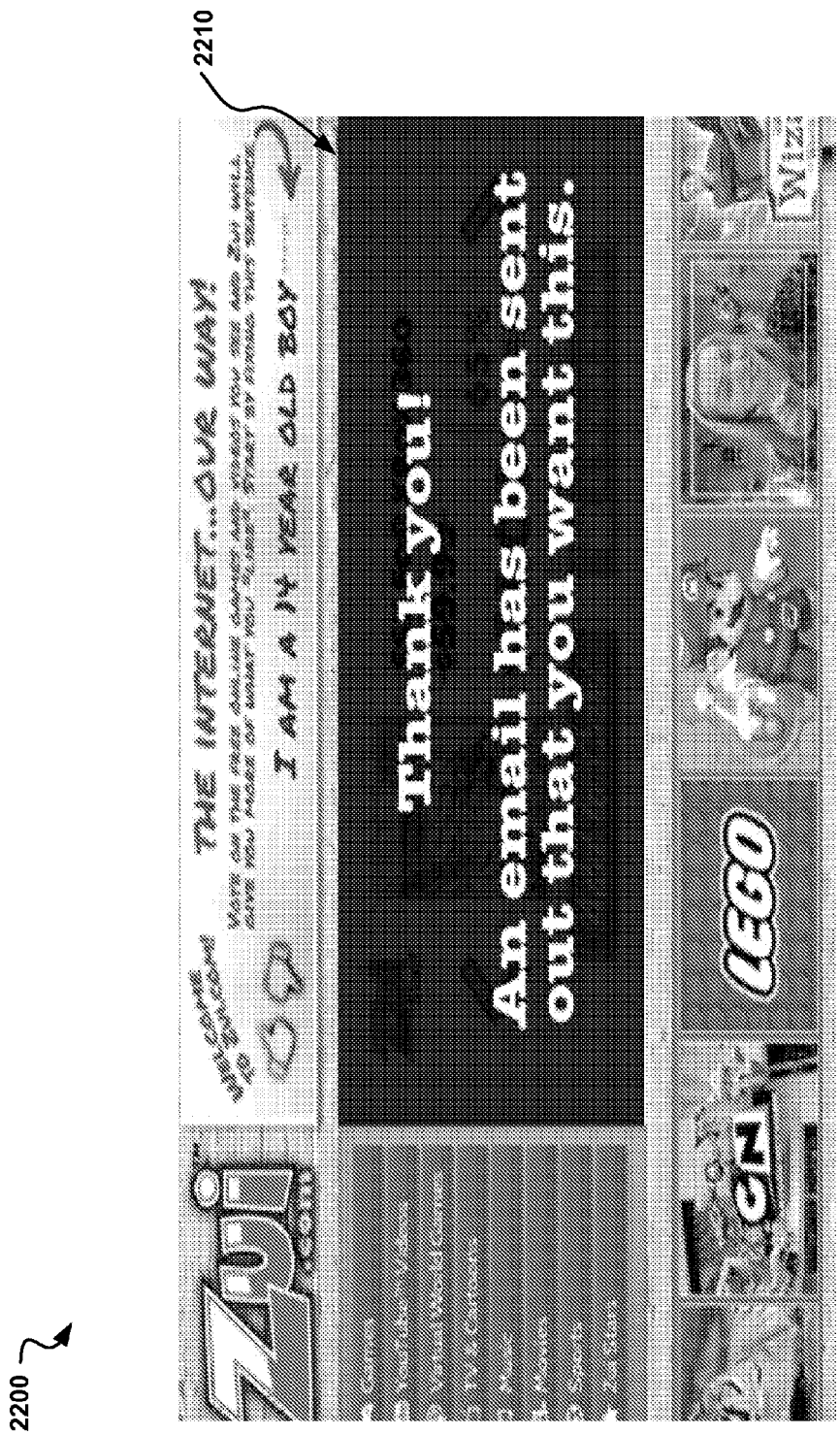
FIG. 22 illustrates details of an embodiment of a screenshot showing an acknowledgement provided after a product was selected for purchase using the user screen of FIG. 21.
Figure 23:
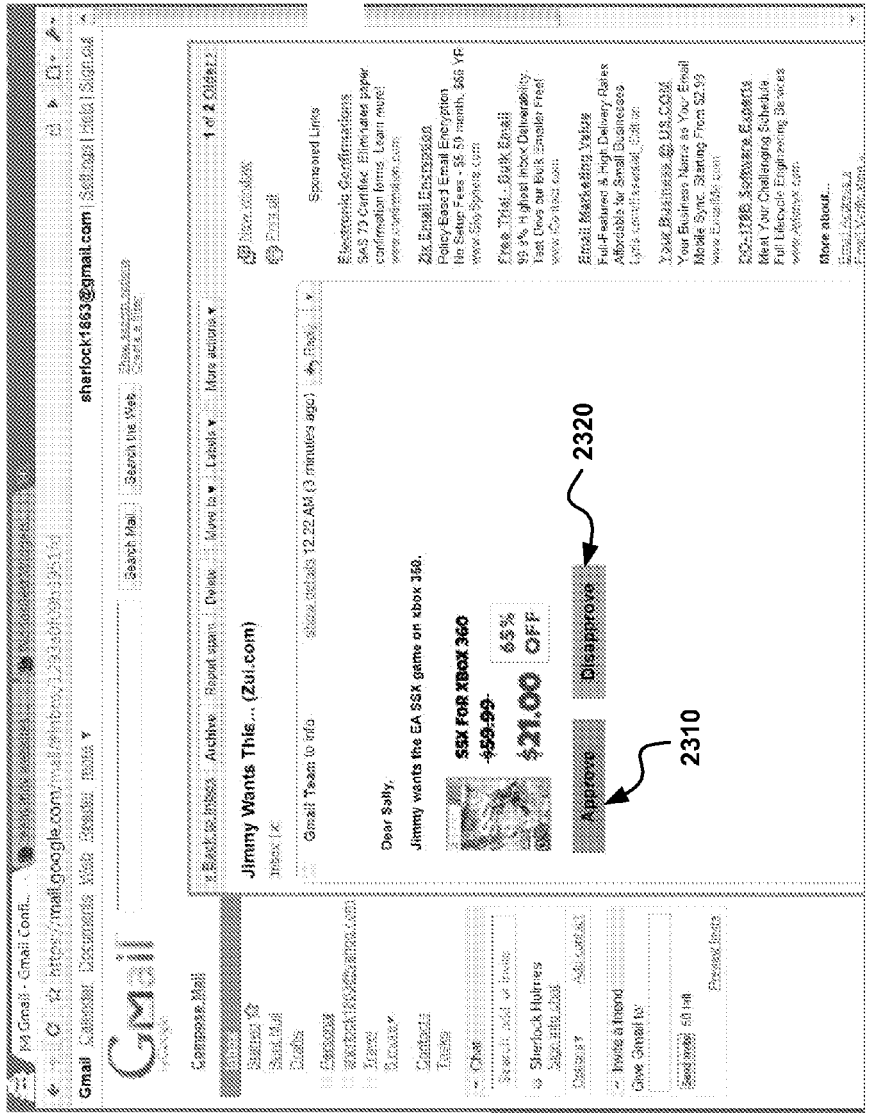
FIG. 23 illustrates details of an embodiment of a screenshot showing a notice provided to a person associated with the user that selected the product using the screen of FIG. 21.

FIGS. 21, 22 and 23 illustrate exemplary screenshots that can be displayed during the processes 1900 and 2000 discussed above. FIG. 21 illustrates details of an embodiment of a screenshot 2100 showing an example of a user screen offering a product for selection to purchase that can be rendered on the display of the user device at step 1910 of the processes 1900 and 2000. Screenshot 2100 illustrates an "Add to Cart" function 2110 input button and an "I Want This" function 2120 input button. These input buttons may be selected by a user to indicate that he or she wants to obtain/purchase the particular product. Selection of the "Add to Cart" function 2110 or the "I Want This" function 2120 may then be used to generate information to be provided to a parent or other person having supervisory authority over the child at the steps 1930 and 1940 of the processes 1900 and 2000.

FIG. 22 illustrates details of an embodiment of a screenshot 2200 showing an acknowledgement 2210 rendered on the user device after a product was selected for purchase using the user screen of FIG. 21.

FIG. 23 illustrates details of an embodiment of a screenshot 2300 showing a notice rendered on a user device associated with a person associated with the user (e.g., a parent or guardian of a child) that selected the product using the screen of FIG. 21. Screenshot 2300 illustrates an "Approve" function 2310 input button and a "Disapprove" function 2320 input button. The "Approve" input button may be selected by the person associated with the user to indicate that he or she approves to obtain/purchase the particular product. Upon selection of the "Approve" function 2310, the user device of the person associated with the user sends the second information that is received at stage 1950 of the process 1900. Selection of the "Disapprove" function 2320 will result in the second information not being sent. However, other information indicating the disapproval could be sent.

In some configurations, the systems and apparatus described herein include means for performing various functions as described herein. In one aspect, the aforementioned means may be a processor or processors and associated memory in which embodiments reside, and which are configured to perform the functions recited by the aforementioned means. The aforementioned means may be, for example, processor and/or memory modules or apparatus residing in modems to perform the functions described herein. In another aspect, the aforementioned means may be a module or apparatus configured to perform the functions recited by the aforementioned means, such as an application program and/or plug-in to an application program.

In one or more exemplary embodiments, the functions, methods and processes described may be implemented in hardware, software, firmware, or any combination thereof. If implemented in software, the functions may be stored on or encoded as one or more instructions or code on a computer-readable medium. The software may include an application program and/or a plug-in for use with an application program. The application program may be, for example, a spreadsheet such as Microsoft Excel.

Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The illustrated processes present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the invention is not intended to be limited to the aspects shown herein, but is to be accorded the full scope consistent with the description herein, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A method, comprising:
    providing, to a first computing device, targeted content for rendering to a first user;
    receiving, from the first computing device, an indication of a favorable reaction made by the first user with respect to the targeted content, the favorable reaction comprising data indicating that the first user has accessed other content related to the targeted content on more than one occasion;
    selecting information to be provided to a second computing device associated with a second user based at least in part on the favorable reaction, the information including an offer to purchase a product;
    electronically sending the information to the second computing device; and
    receiving, from the second computing device, an acceptance of the offer, wherein the acceptance includes an indication of approval by the second user to purchase the product.

2. The method of claim 1, wherein the targeted content includes a favorable reaction indicator selectable by the first user.

3. The method of claim 2, wherein the favorable reaction indicator comprises a "Like" option.

4. The method of claim 1 wherein the information includes an advertisement selected based at least in part on the favorable reaction.

5. The method of claim 1, wherein the targeted content comprises targeted advertising selected based on an input to the first computing device provided by the first user.

6. The method of claim 5, wherein the targeted advertising is associated with a video game.

7. The method of claim 5, wherein the targeted advertising is associated with a movie or television program.

8. The method of claim 5, wherein the targeted advertising is associated with a musical product.

9. The method of claim 5, wherein the targeted advertising is associated with a social network function.

10. The method of claim 9, wherein the social network function is a social network game or contest.

11. The method of claim 1, wherein the information includes data concerning the first user's usage of particular content from a website rendered by the first computing device.

12. The method of claim 11, wherein the data concerning the first user's usage includes information relating to the first user's usage frequency of one or more content items on the website.

13. The method of claim 11, wherein the data includes temporal usage information.

14. The method of claim 1, wherein the electronically sending includes sending the information immediately upon the receiving of the indication.

15. The method of claim 1, wherein the electronically sending includes generating aggregated information by aggregating the information with other user information and sending the aggregated information.

16. The method of claim 1, wherein the first user is a child and the second user is a parent of the first user.

17. The method of claim 1, further comprising:
receiving user information associated with an age of the first user; and
selecting the information to be provided based in part on the age of the first user.

18. The method of claim 1, further comprising:
receiving user information associated with the gender of the first user; and
selecting the information to be provided based in part on the gender of the first user.

19. The method of claim 1, further comprising:
determining a location associated with the first user; and
selecting the information to be provided based in part on the location.

20. The method of claim 19, wherein the location is determined based on a IP address associated with the first user.

21. The method of claim 19, wherein the location is determined based on information provided by the first user.

22. The method of claim 19, wherein the location information is determined based on GPS data or other electronic location information.

23. The method of claim 1, further comprising:
receiving an age of the first user;
receiving user information associated with a gender of the first user; and
selecting the information to be provided based in part on the age of the first user and the gender of the first user.

24. The method of claim 23, further comprising receiving a location of the first user wherein the selecting is further based in part on the location of the first user.

25. The method of claim 1, further comprising:
selecting additional information to be provided to the first user based at least in part on the favorable reaction; and
electronically sending the additional information.

26. The method of claim 25, further comprising:
receiving an age of the first user;
receiving a gender of the first user; and
selecting the additional information to be provided based in part on the age of the first user and the gender of the first user.

27. The method of claim 26, further comprising receiving a location of the first user wherein the selecting is further based in part on the location of the first user.

28. The method of claim 1, further comprising:
receiving user information pertaining to an activity being performed by the first user; and
including the user information within the information to be provided.

29. The method of claim 28, wherein the activity is playing a game.

30. The method of claim 28, wherein the activity is viewing a movie.

31. The method of claim 28, wherein the activity is listening to music.

32. The method of claim 28, wherein the activity is interacting with educational content.

33. The method of claim 32, wherein the educational content is an educational software application.

34. A processor readable, non-transitory medium comprising instructions for causing a processor to:
provide, to a first computing device, targeted content for rendering to a first user;
receive, from the first computing device, an indication of a favorable reaction made by the first user with respect to the targeted content, the favorable reaction comprising data indicating that the first user has accessed other content related to the targeted content on more than one occasion;
select information to be provided to a second computing device associated with a second user based at least in part on the favorable reaction, the information including an offer to purchase a product;
electronically send the information to the second computing device; and
receive, from the second computing device, an acceptance of the offer, wherein the acceptance includes an indication of approval by the second user to purchase the product.

35. A server system, comprising:
a processor; and
a memory coupled to the processor, said memory containing instructions for execution on the processor to:
provide, to a first computing device, targeted content for rendering to a first user;
receive, from the first computing device, an indication of a favorable reaction made by the first user with respect to the targeted content, the favorable reaction comprising data indicating that the first user has accessed other content related to the targeted content on more than one occasion;
select information to be provided to a second computing device associated with a second user based at least in part on the favorable reaction, the information including an offer to purchase a product;

electronically send the information to the second computing device; and receive, from the second computing device, an acceptance of the offer, wherein the acceptance includes an indication of approval by the second user to purchase the product.

36. The server system of claim 35 wherein the information to be provided includes one or more advertisements, the system further comprising an Ad Server coupled to the processor, said Ad Server configured to store the one or more advertisements.

37. A server system, comprising:

means for sending, to a first computing device, targeted content for rendering to a first user;

means for receiving, from the first computing device, an indication of a favorable reaction made by the first user with respect to the targeted content, the favorable reaction comprising data indicating that the first user has accessed other content related to the targeted content on more than one occasion;

means for selecting information to be provided to a second computing device associated with a second user based at least in part on the favorable reaction, the information including an offer to purchase a product;

means for electronically sending the information to the second computing device; and means for receiving, from the second computing device, an acceptance of the offer, wherein the acceptance includes an indication of approval by the second user to purchase the product.

38. A method, comprising:

sending, to a first computing device, targeted content for rendering to a first user;

receiving, at a server computing device, an indication of a preference selection made by the first user with respect to the targeted content;

combining, at the server computing device, the preference selection with preference selection data indicating that the first user has accessed other content related to the targeted content on more than one occasion;

generating, at the server computing device, information associated with the preference selection data wherein the server computing device is configured to select and electronically send the information to a second computing device of a second user associated with the first user, the information including an offer to purchase a product; and receiving, from the second computing device, an acceptance of the offer, wherein the acceptance includes an indication of approval by the second user to purchase the product.

39. The method of claim 38, wherein the information defines the preference selection relative to a targeted advertisement associated with the targeted content.

40. The method of claim 38 wherein the information includes an advertisement selected based at least in part on the preference selection.

41. The method of claim 38, wherein the targeted content comprises targeted advertising selected based at least in part on an input provided by the first user.

42. The method of claim 41, wherein the targeted content is associated with a video game.

43. The method of claim 41, wherein the targeted advertising is associated with a movie or television program.

44. The method of claim 41, wherein the targeted advertising is associated with a musical product.

45. The method of claim 41, wherein the targeted advertising is associated with a social network function.

46. The method of claim 45, wherein the social network function is a social network game or contest.

47. The method of claim 38, wherein the information includes data concerning the first user's usage of particular content from a website rendered by the first computing device.

48. The method of claim 47, wherein the data concerning the first user's usage includes information relating to the first user's usage frequency of one or more content items on the website.

49. The method of claim 47, wherein the data includes temporal usage information.

50. The method of claim 38, wherein the first user is a child and the second user is a parent of the child.

51. A processor readable, non-transitory medium comprising instructions for causing a processor to:

send, to a first computing device, targeted content for rendering to a first user;

receive, at a server computing device, an indication of a preference selection made by the first user with respect to the targeted content;

combining, at the server computing device, the preference selection with preference selection data indicating that the first user has accessed other content related to the targeted content on more than one occasion;

generate, at the server computing device, information associated with the preference selection data wherein the server computing device is configured to select and electronically send the information to a second computing device of a second user associated with the first user, the information including an offer to purchase a product; and receive, from the second computing device, an acceptance of the offer, wherein the acceptance includes an indication of approval by the second user to purchase the product.

52. A user device, comprising:

a processor; and a memory coupled to the processor, said memory containing instructions for execution on the processor which cause the processor to:

receive, at the user device, targeted content for rendering to a first user;

send, to, a server computing device, an indication of a preference selection made by the first user with respect to the targeted content;

combining, at the server computing device, the preference selection with preference selection data indicating that the first user has accessed other content related to the targeted content on more than one occasion; and generate, at the server computing device, information associated with the preference selection data wherein the server computing device is configured to select and electronically send the information to a second computing device of a second user associated with the first user, the information including an offer to purchase a product; and receive, from the second computing device, an acceptance of the offer, wherein the acceptance includes an indication of approval by the second user to purchase the product.

53. A method, comprising:
- providing, to a second computing device associated with a second user an advertisement for a product for which a first user has accessed related content on more than one occasion;
- receiving an indication that the advertisement has been rendered by the second computing device; and
- providing, to the second computing device, preference information from the first user, the information including an offer to purchase a product related to the content; and
- receiving, from the second computing device, an acceptance of the offer, wherein the acceptance includes an indication of approval by the second user to purchase the product.

54. The method of claim 53 wherein the preference information comprises statistical information.

55. The method of claim 53 further including receiving, from the first computing device associated with the first user, a request to purchase the product.

56. The method of claim 53 further including receiving, from the second computing device associated with the second user, authorization for the first user to purchase the product.

57. The method of claim 53 wherein the indication is representative of selection by the user of a preference selection option indicating the first user liked the advertisement.

58. The method of claim 53 wherein the indication is representative of selection by the first user of a preference selection option indicating the user disliked the advertisement.

\* \* \* \* \*